United States Patent
Noguchi et al.

(10) Patent No.: US 11,785,346 B2
(45) Date of Patent: Oct. 10, 2023

(54) IMAGING DEVICE AND IMAGING CONTROL METHOD

(71) Applicant: SONY GROUP CORPORATION, Tokyo (JP)

(72) Inventors: Shohei Noguchi, Tokyo (JP); Daisuke Nakao, Tokyo (JP); Jiro Takatori, Tokyo (JP); Hiroaki Ebi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/595,987

(22) PCT Filed: Jun. 5, 2020

(86) PCT No.: PCT/JP2020/022355
§ 371 (c)(1),
(2) Date: Dec. 1, 2021

(87) PCT Pub. No.: WO2020/250831
PCT Pub. Date: Dec. 17, 2020

(65) Prior Publication Data
US 2022/0337735 A1     Oct. 20, 2022

(30) Foreign Application Priority Data
Jun. 13, 2019   (JP) ................................ 2019-110548

(51) Int. Cl.
*H04N 23/73* (2023.01)
*H04N 23/62* (2023.01)
*H04N 23/667* (2023.01)

(52) U.S. Cl.
CPC ............. *H04N 23/73* (2023.01); *H04N 23/62* (2023.01); *H04N 23/667* (2023.01)

(58) Field of Classification Search
CPC ...... H04N 23/73; H04N 23/62; H04N 23/667; H04N 23/60; H04N 23/61; G03B 39/00
See application file for complete search history.

(56) References Cited

U.S. PATENT DOCUMENTS 8,891,000 B2 * 11/2014 Lee .................. H04N 23/73
348/157
2009/0147122 A1 * 6/2009 Kato ................ H04N 23/667
348/E5.025

(Continued)

FOREIGN PATENT DOCUMENTS

CN      103339927 A    10/2013
EP      2671377 A2     12/2013

(Continued)

OTHER PUBLICATIONS

International Search Report and Written Opinion of PCT Application No. PCT/JP2020/022355, dated Jul. 7, 2020, 09 pages of ISRWO.

(Continued)

*Primary Examiner* — Ahmed A Berhan
(74) *Attorney, Agent, or Firm* — CHIP LAW GROUP

(57) ABSTRACT

An imaging device according to the present disclosure includes an exposure section and a controller. The controller controls, at an exposure timing based on a predicted exposure timing at which a state of a subject shot at a first frame rate is predicted to satisfy a predetermined condition, the exposure section at a second frame rate. The second frame rate is different from the first frame rate.

18 Claims, 27 Drawing Sheets

(56) References Cited

U.S. PATENT DOCUMENTS

| | | | |
|---|---|---|---|
| 2010/0214439 A1* | 8/2010 | Oshima | H04N 23/633 348/E5.037 |
| 2012/0194637 A1 | 8/2012 | Han et al. | |
| 2012/0200762 A1 | 8/2012 | Nakano | |

FOREIGN PATENT DOCUMENTS

| | | | | |
|---|---|---|---|---|
| JP | 2010-239169 A | | 10/2010 | |
| JP | 2010239169 A | * | 10/2010 | ............. H04N 5/145 |
| JP | 2012-165243 A | | 8/2012 | |
| JP | 2014-509126 A | | 4/2014 | |
| JP | 2014-236237 A | | 12/2014 | |
| JP | 2015-019243 A | | 1/2015 | |
| JP | 2017-183952 A | | 10/2017 | |
| JP | 2018-019191 A | | 2/2018 | |
| KR | 10-2012-0088431 A | | 8/2012 | |
| RU | 2013140392 A | | 3/2015 | |
| WO | 2012/105768 A2 | | 8/2012 | |
| WO | 2019/082832 A1 | | 5/2019 | |

OTHER PUBLICATIONS

Extended European Search Report of EP Application No. 20823281.9, dated Jun. 15, 2022, 11 pages.

\* cited by examiner

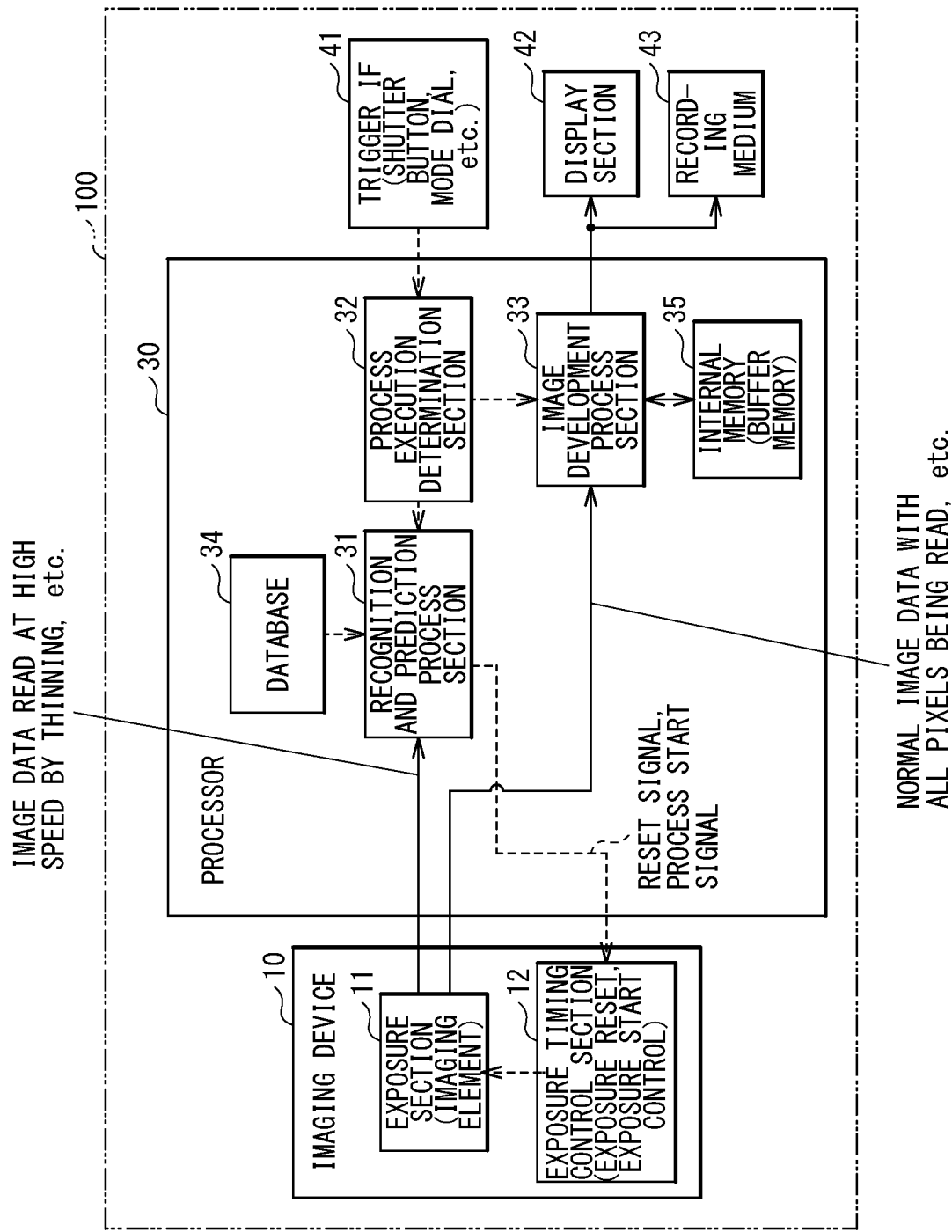
[FIG. 1]

[FIG. 2]
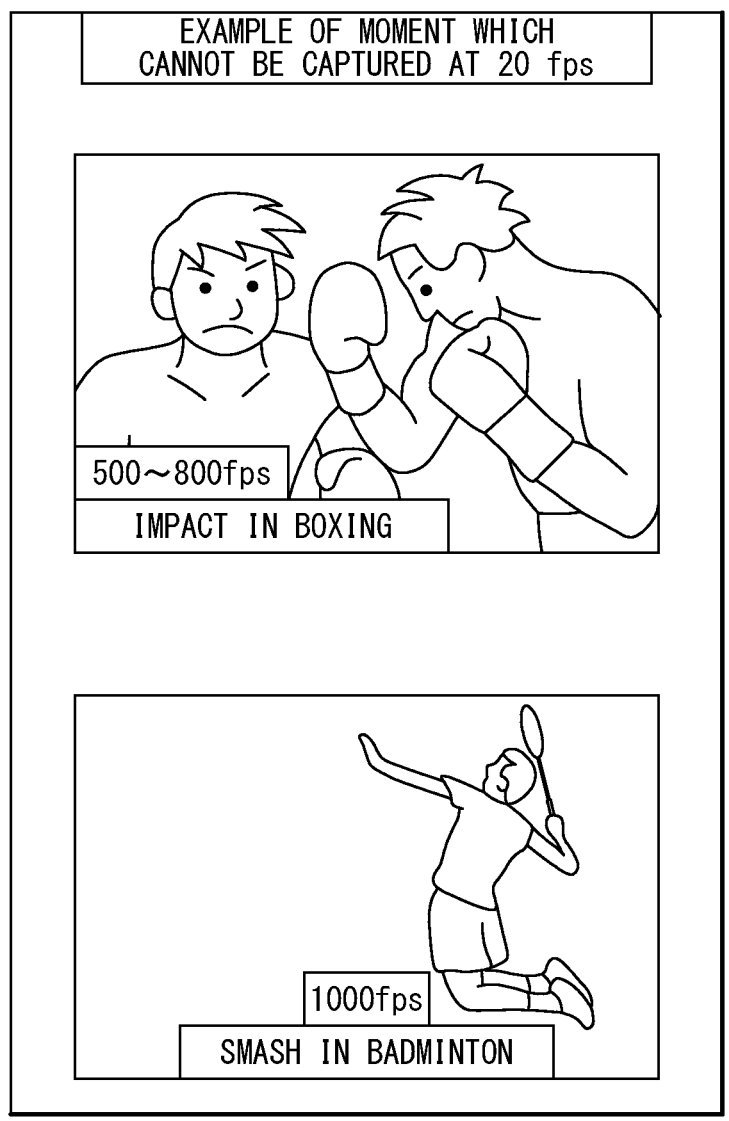

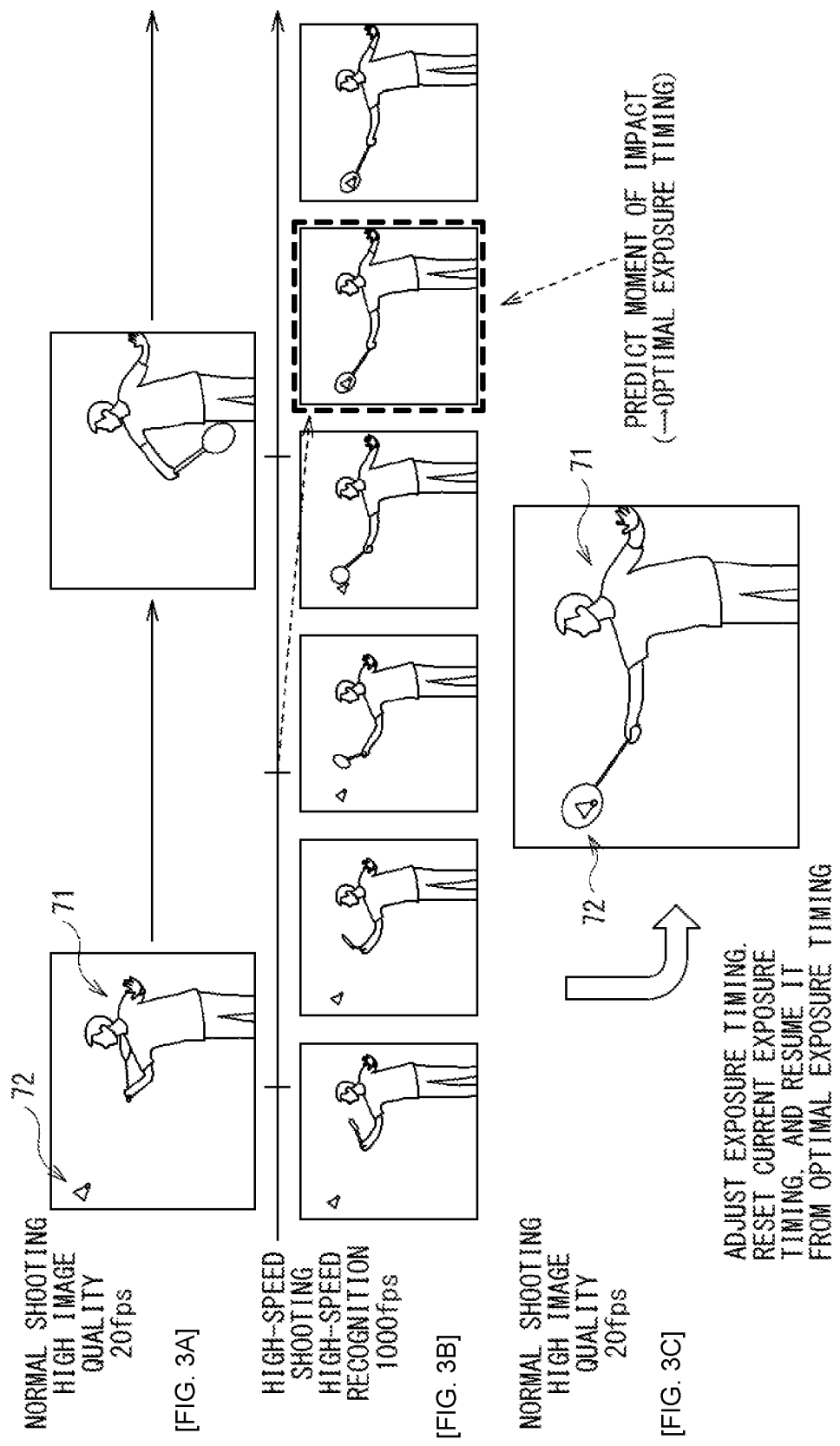

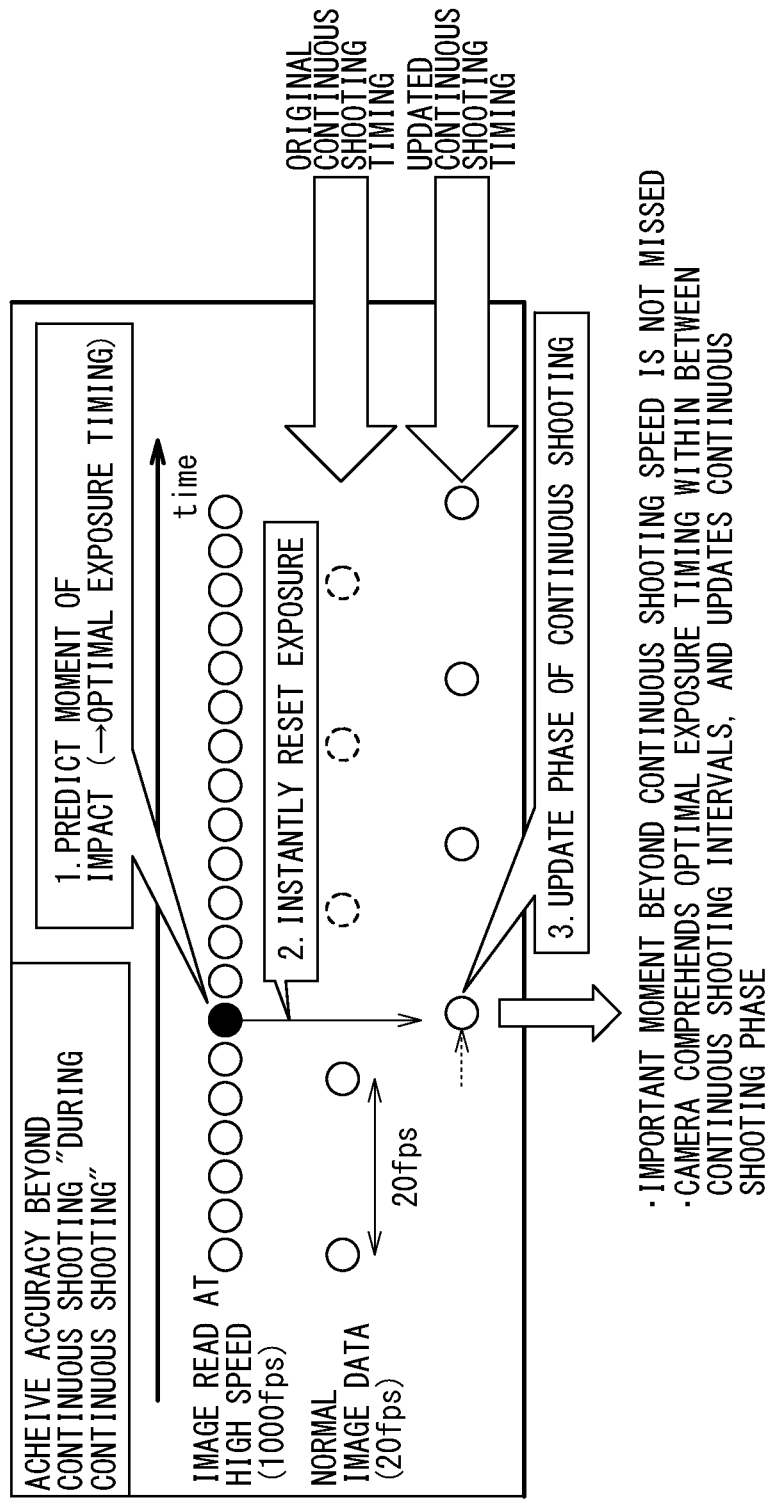
[FIG. 4]

[FIG. 5]
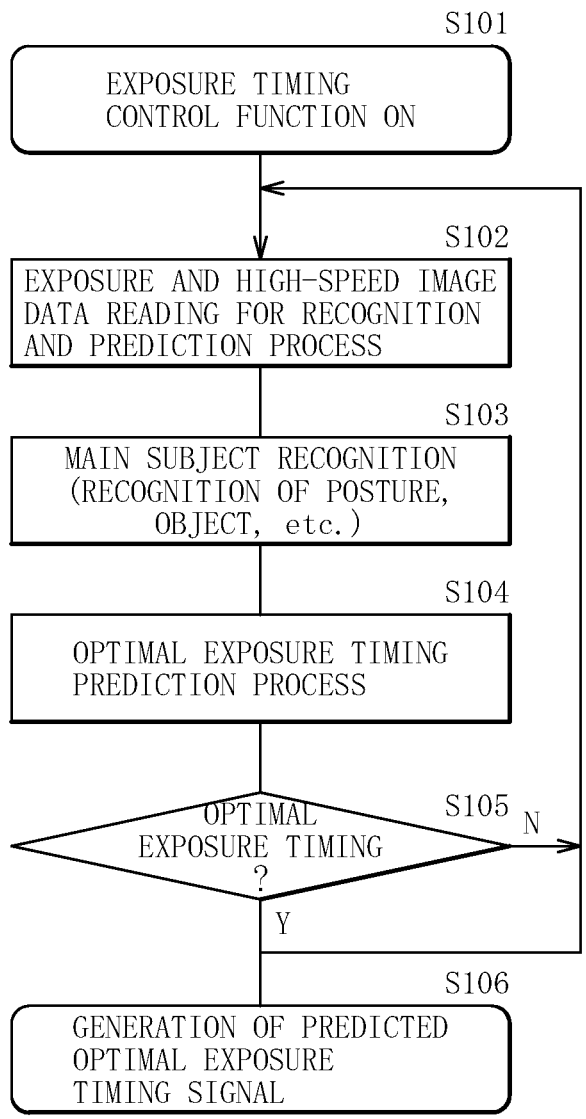

[FIG. 6]
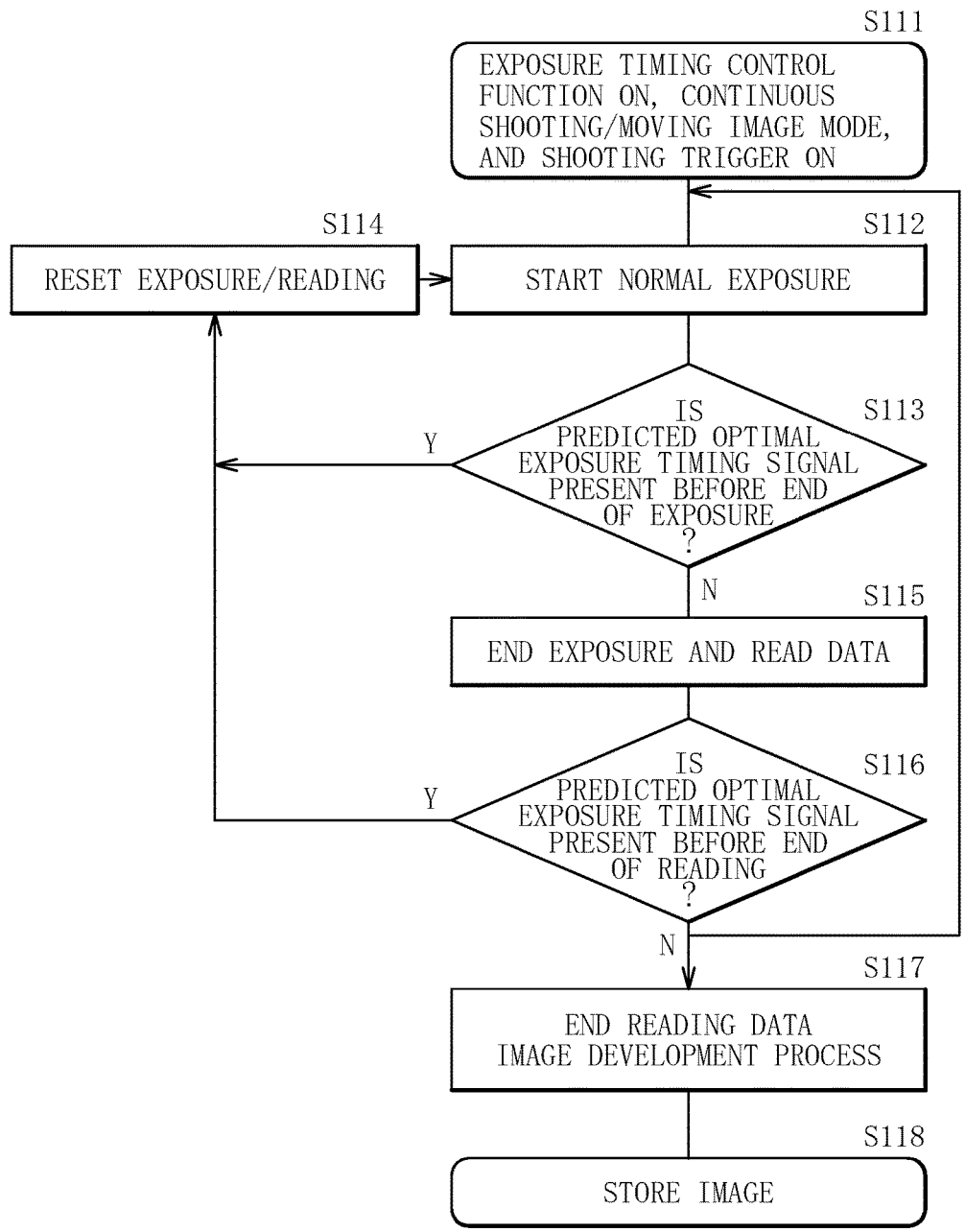

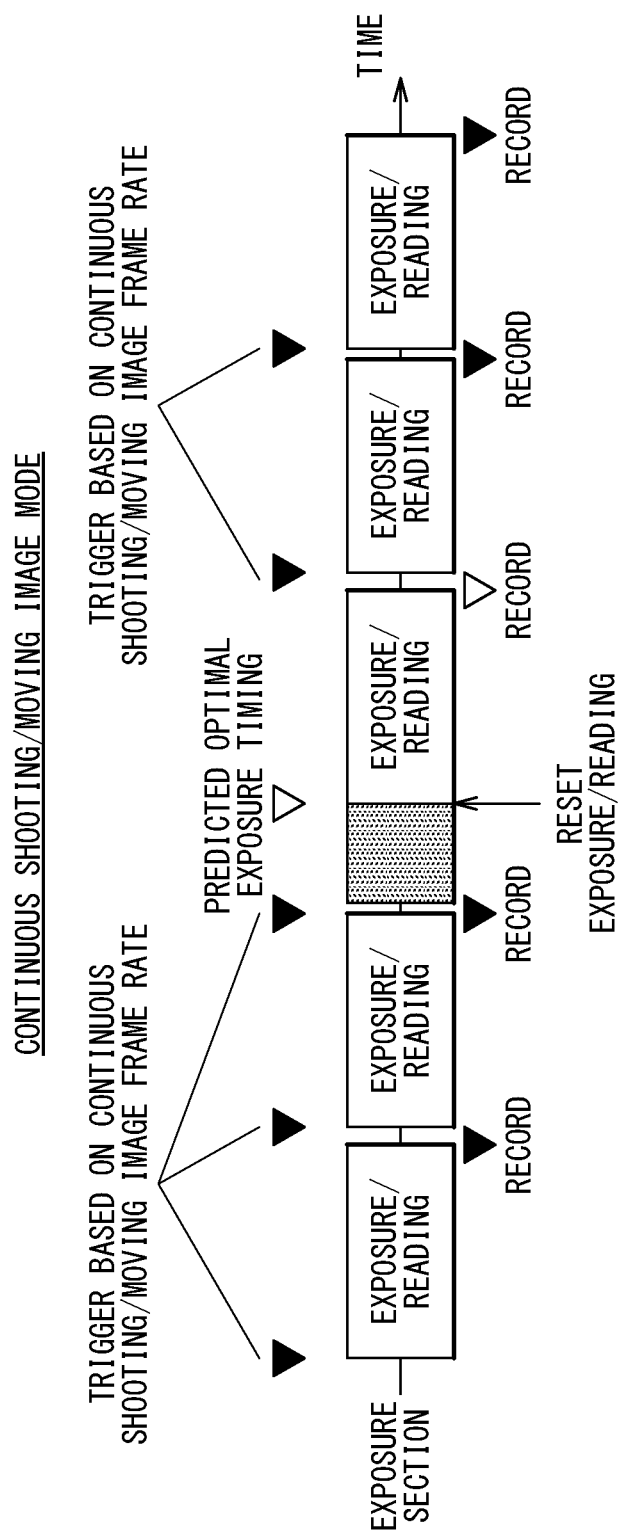

[FIG. 8]
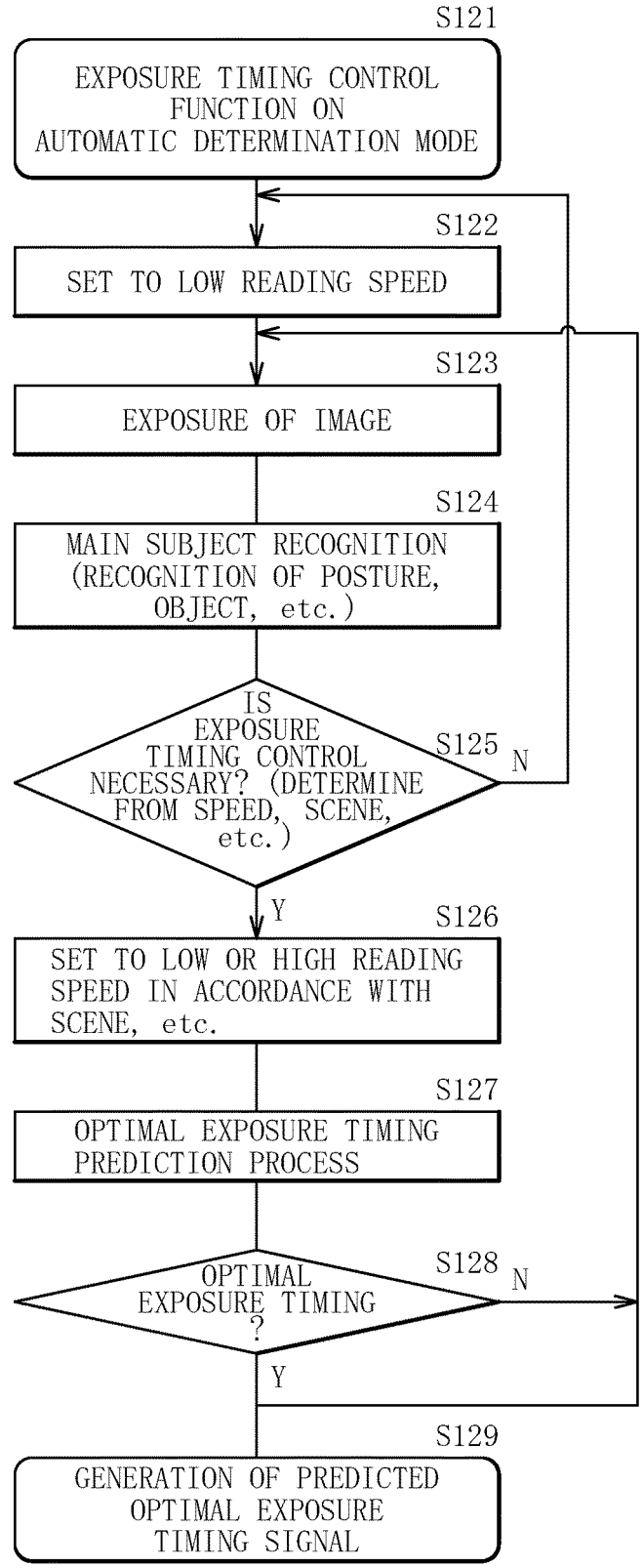

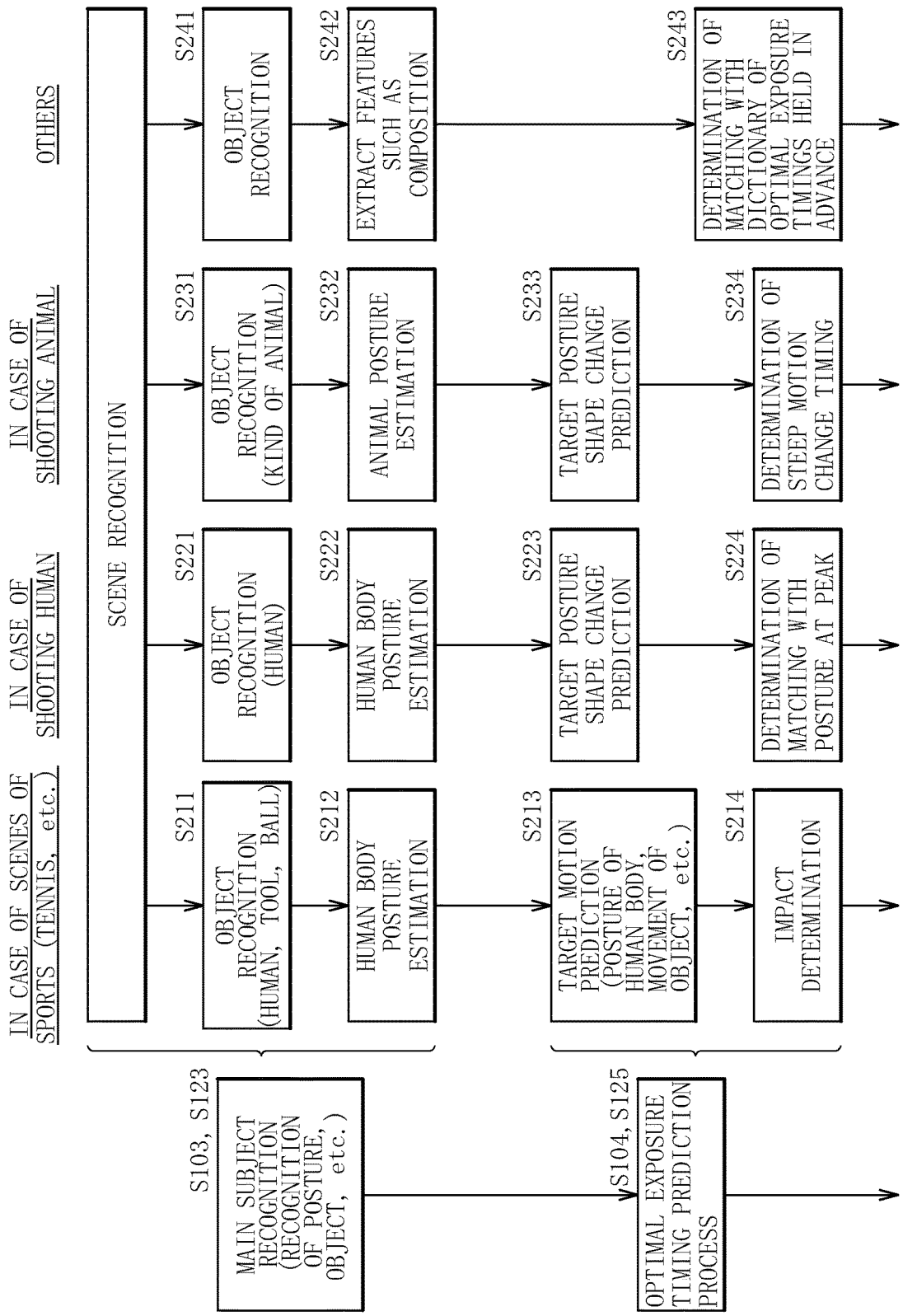
[FIG. 9]

[FIG. 10]
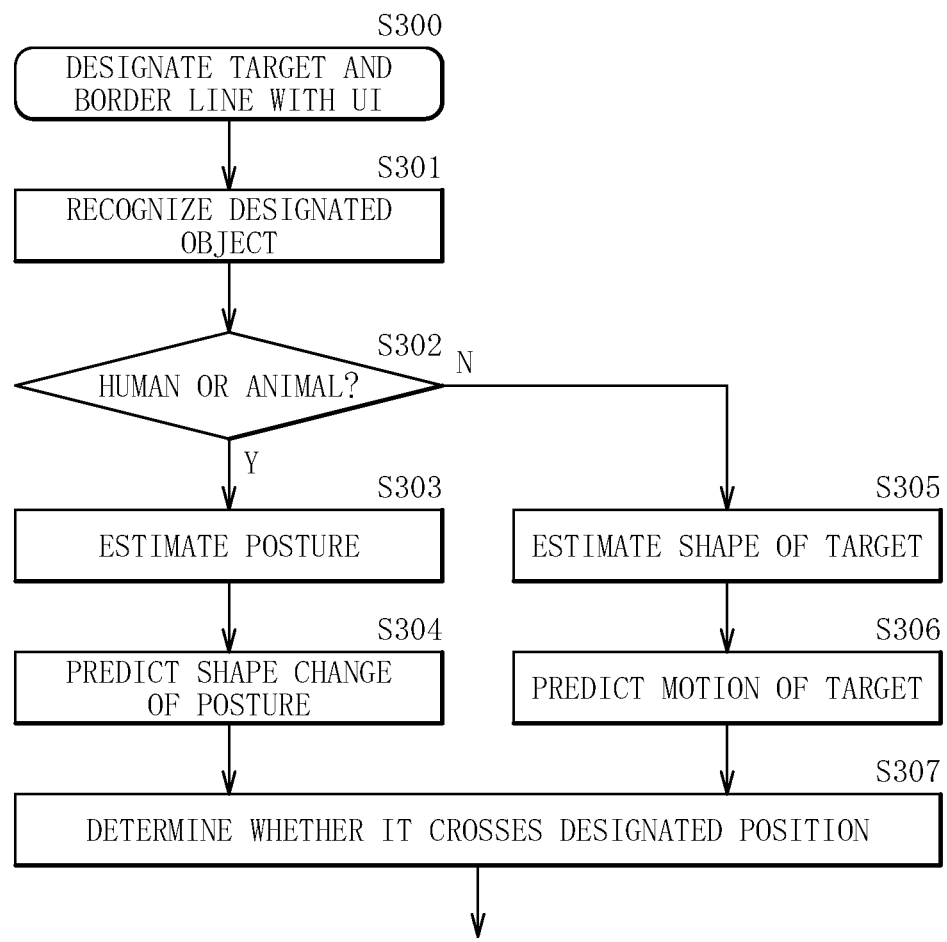

[FIG. 11]

| | DATABASE FOR IDENTIFYING SCENE | DATABASE FOR RECOGNIZING MOVEMENT OR THE LIKE IN SCENE | DATABASE FOR PREDICTING OPTIMAL EXPOSURE TIMING FOR RECOGNIZED MOVEMENT | SPECIFIC EXAMPLES |
|---|---|---|---|---|
| 1 | SPORTS FOR WHICH PEOPLE USE TOOLS (TENNIS, BASEBALL, BADMINTON, AND GOLF) | MOVEMENTS OF HUMAN BODY, TOOL 1 (RACKET), AND TOOL 2 (BALL) | TIMING OF IMPACT BETWEEN TOOL 1 (RACKET) AND TOOL 2 (BALL) | · MOMENT WHEN RACKET HITS BALL<br>· MOMENT WHEN BAT HITS BALL<br>· MOMENT WHEN RACKET HITS SHUTTLECOCK<br>· MOMENT WHEN BALL IS DETERMINED TO ENTER GOAL |
| 2 | SPORTS FOR WHICH PEOPLE USE TOOL (SOCCER AND KENDO) | MOVEMENTS OF HUMAN BODY AND TOOL 1 (BALL) | TIMING OF IMPACT BETWEEN HUMAN AND TOOL 1 (BALL) | · MOMENT WHEN FOOT HITS BALL<br>· MOMENT WHEN HAND HITS BALL<br>· MOMENT WHEN BALL LEAVES HAND<br>· MOMENT WHEN BAMBOO SWORD HITS KENDO MASK |
| 3 | SPORTS FOR WHICH PEOPLE USE NO TOOL (TRACK AND FIELD, SWIMMING, DANCE, GYMNASTICS, AND JUDO) | MOVEMENT OF HUMAN BODY | TIMING OF MOMENT WHICH PEOPLE WANT TO SEE MOST IN THAT SPORT | · MOMENT OF GOAL<br>· MOMENT OF OVERTAKING<br>· AT TOP OF JUMP IN LONG JUMP<br>· MOMENT OF STRIKING POSE<br>· MOMENT OF PUNCH HITTING IN BOXING<br>· MOMENT OF MAKING TACKLE<br>· MOMENT OF FALLING DOWN BY TACKLE<br>· MOMENT WHEN BODY IS THROWN UP IN AIR |
| 4 | PORTRAIT SHOOTING | MOVEMENTS OF HUMAN BODY AND FACE | TIMING OF OPTIMAL POSTURE AND EXPRESSION FOR PORTRAIIT | · MOMENT OF SMILE<br>· MOMENT WHEN TWO OR MORE PEOPLE'S EYES ARE ALL OPEN<br>· MOMENT WHEN PERSON LOOKS BACK<br>· MOMENT WHEN SPEAKER'S MOUTH IS IN GOOD SHAPE AND SPEAKER'S EYES ARE OPEN |

[FIG. 12]

| | DATABASE FOR IDENTIFYING SCENE | DATABASE FOR RECOGNIZING MOVEMENT OR THE LIKE IN SCENE | DATABASE FOR PREDICTING OPTIMAL EXPOSURE TIMING FOR RECOGNIZED MOVEMENT | SPECIFIC EXAMPLES |
|---|---|---|---|---|
| 5 | ANIMAL SHOOTING | MOVEMENT OF ANIMAL | TIMING WHEN ANIMAL STARTS MOVING, TIMING WHEN ANIMAL SHOWS STRIKING MOVEMENT | · MOMENT WHEN BIRD FLIES OFF<br>· MOMENT WHEN BIRD STRETCHES ITS WINGS MOST<br>· MOMENT WHEN ANIMAL STARTS RUNNING<br>· MOMENT WHEN ANIMAL LOOKS THIS WAY<br>· MOMENT OF PREY OF ANIMAL (WHEN ANIMAL OPENS ITS MOUTH WIDELY)<br>· MOMENT WHEN UNDERWATER ANIMAL SHOWS UP FROM WATER SURFACE |
| 6 | MOVING OBJECT SHOOTING | MOVEMENT OF MOVING OBJECT | WHEN MOVING OBJECT FITS INTO OPTIMAL COMPOSITION | · PHOTO OF FRONT OF RUNNING TRAIN<br>· GOAL SCENE OF CAR RACE<br>· SCENE OF TAKING-OFF AND LANDING OF AIRPLANE |
| 7 | SCENERY SHOOTING | MOVEMENT OF TARGET OBJECT, SIGN OF APPEARANCE OF TARGET OBJECT, etc. | APPEARANCE TIMING OF TARGET, MOMENT WHEN TARGET IS PRESENT AT OPTIMAL POSITION, etc. | · MOMENT OF LIGHTNING<br>· MOMENT WHEN SHOOTING STAR CAN BE SHOT BEAUTIFULLY<br>· MOMENT WHEN FIREWORK SPREADS WIDELY<br>· MOMENT WHEN TRAJECTORY OF FIREWORK CAN BE SHOT BEAUTIFULLY |

[FIG. 13]
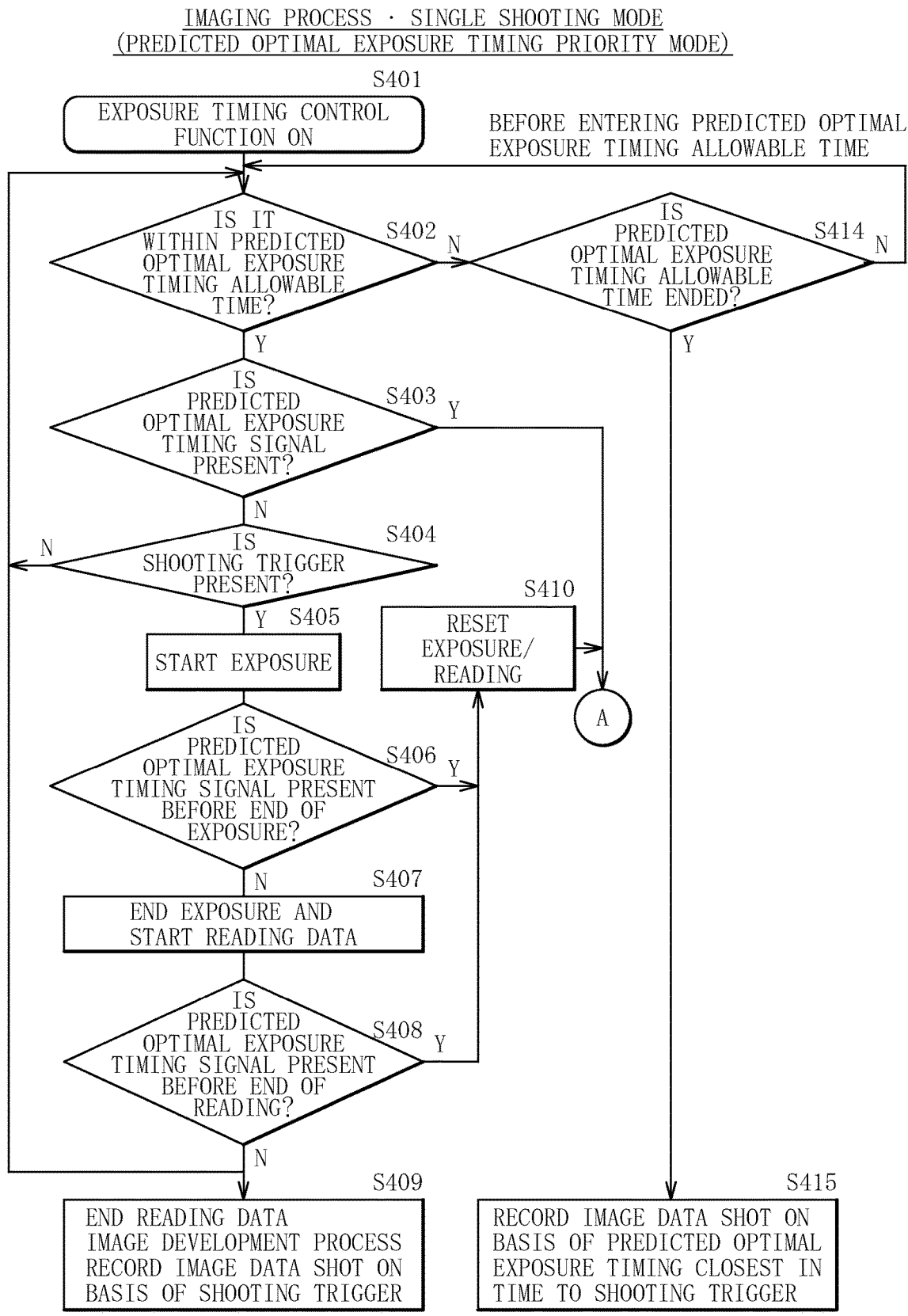

[FIG. 14]
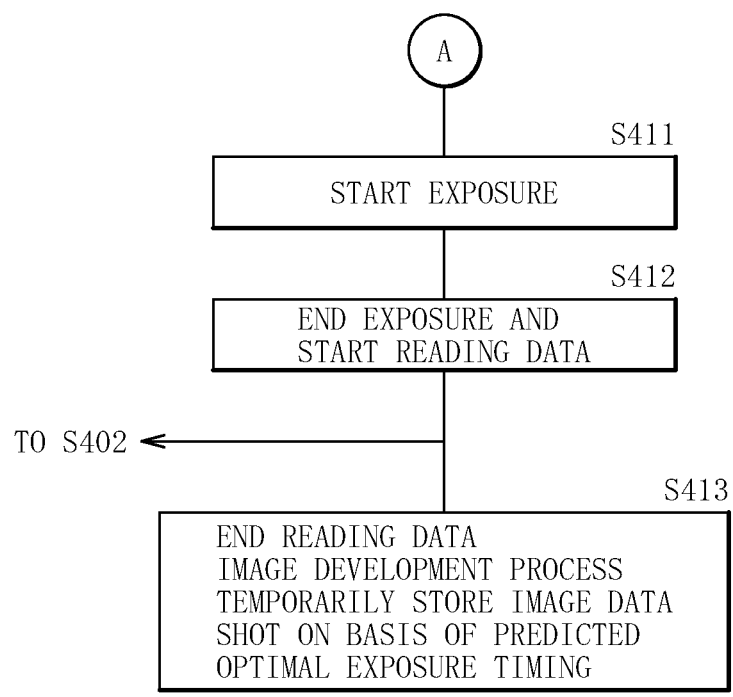

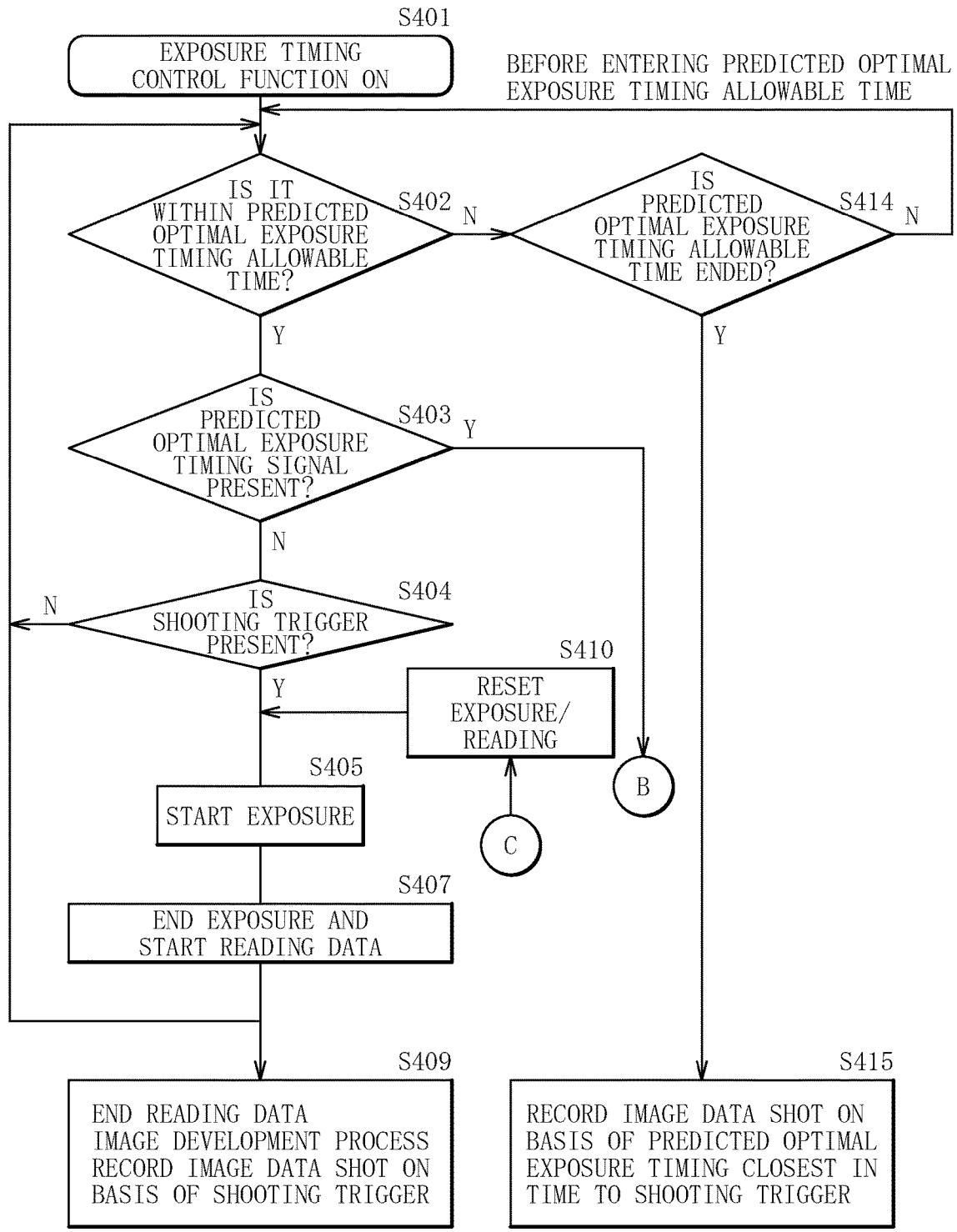
[FIG. 15]

[FIG. 16]
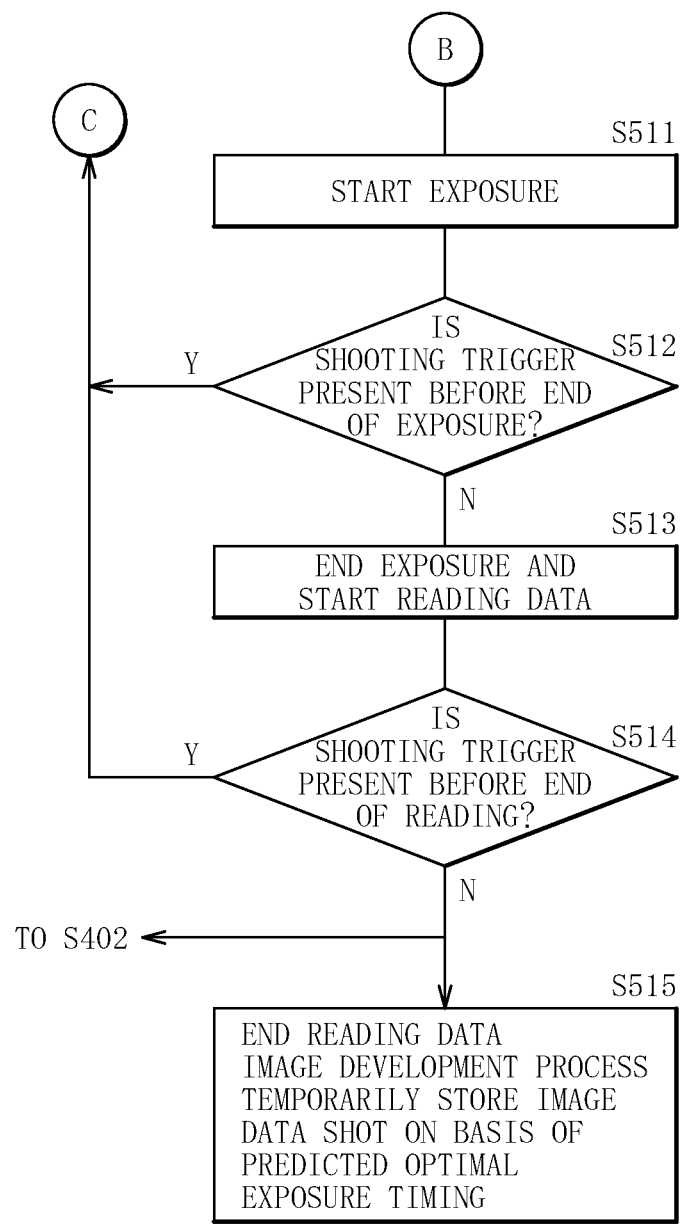

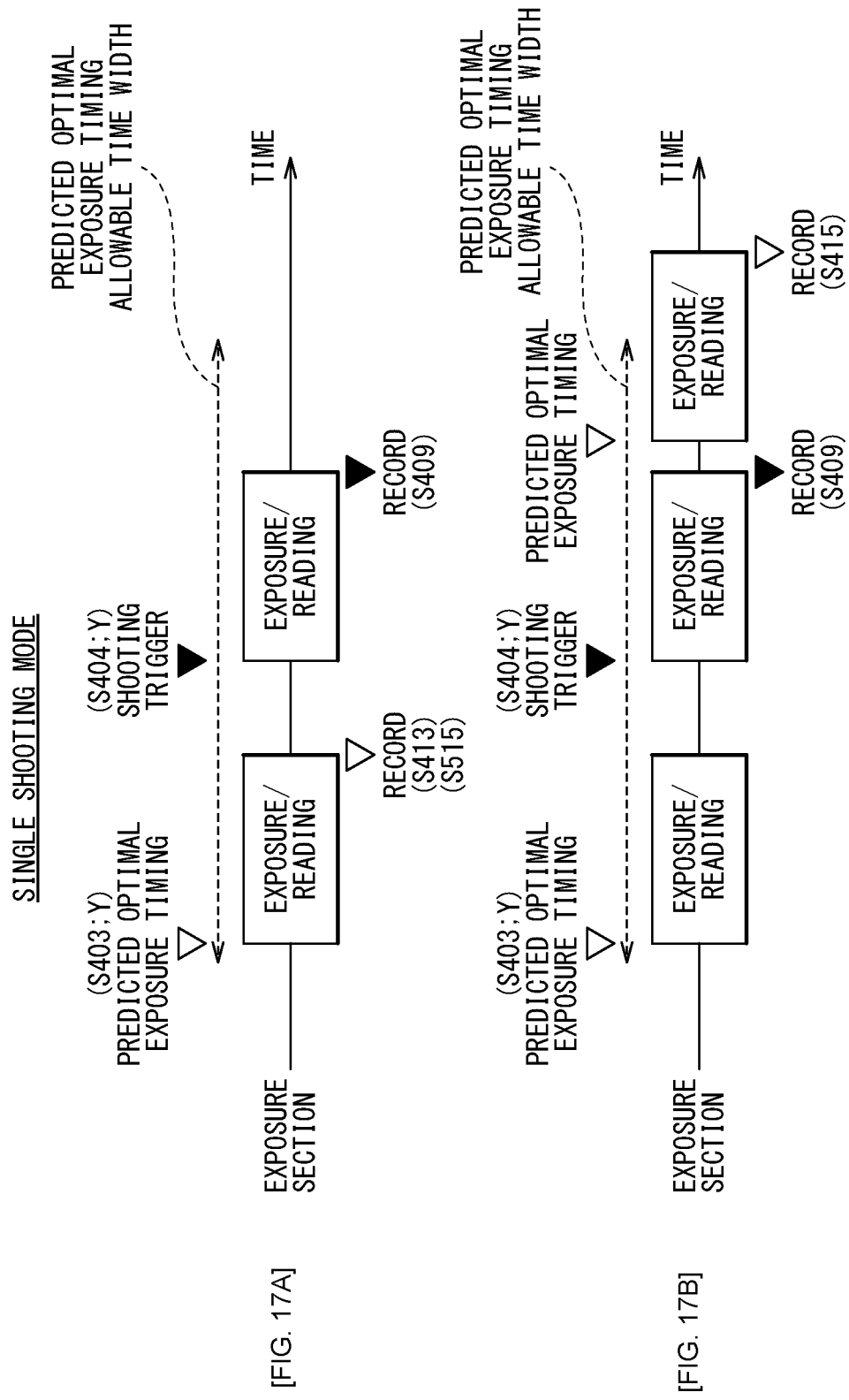

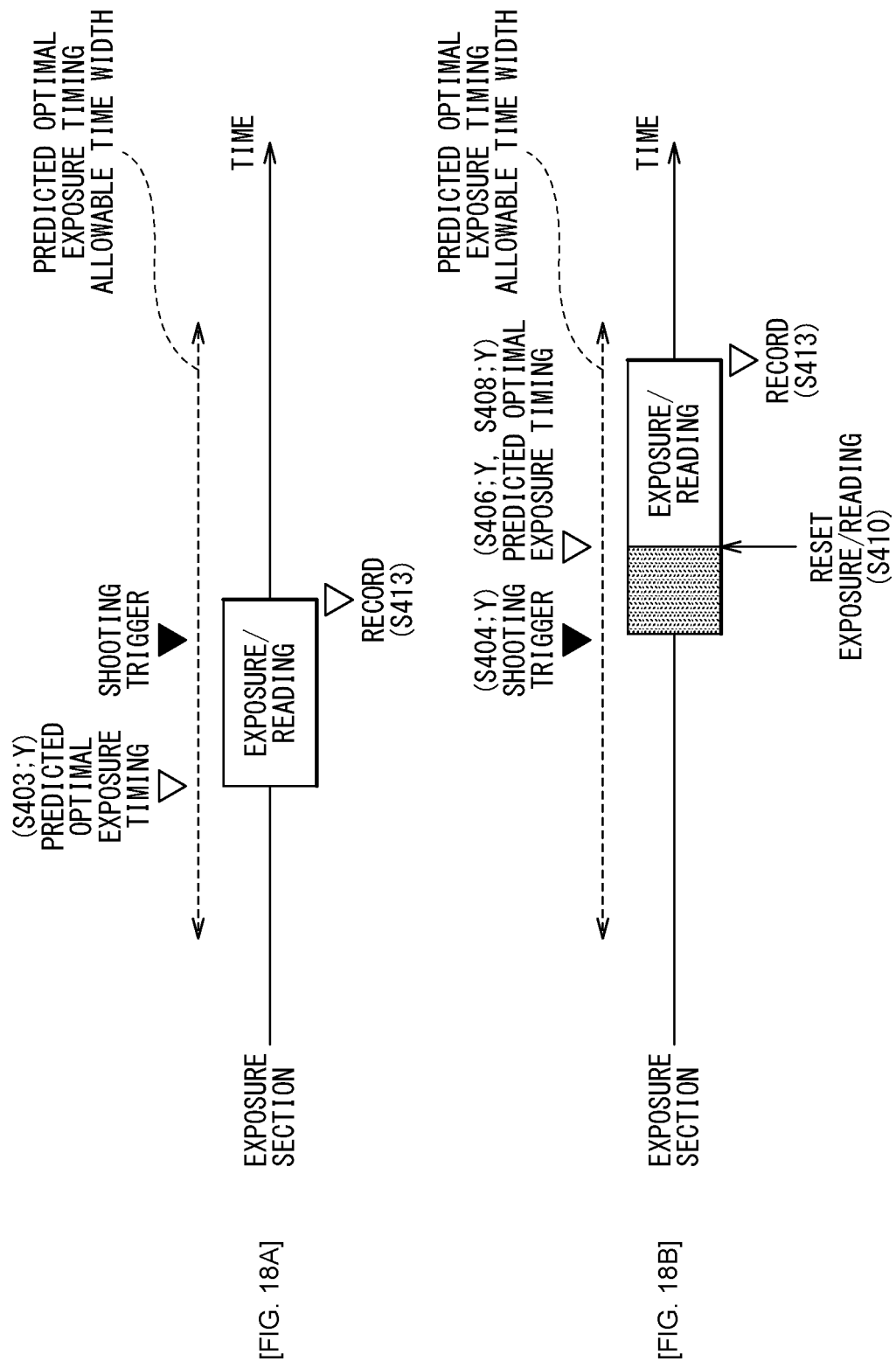

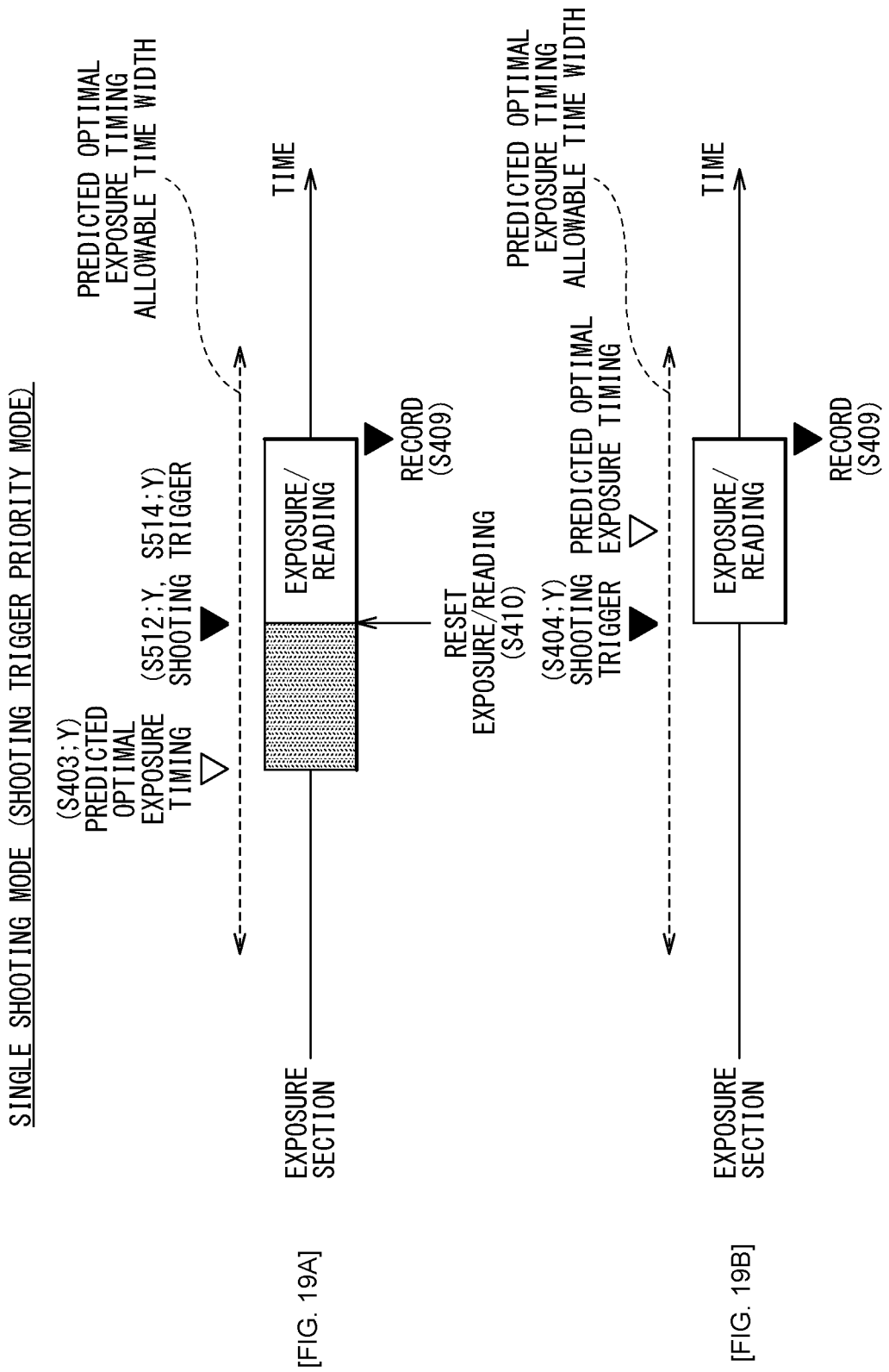

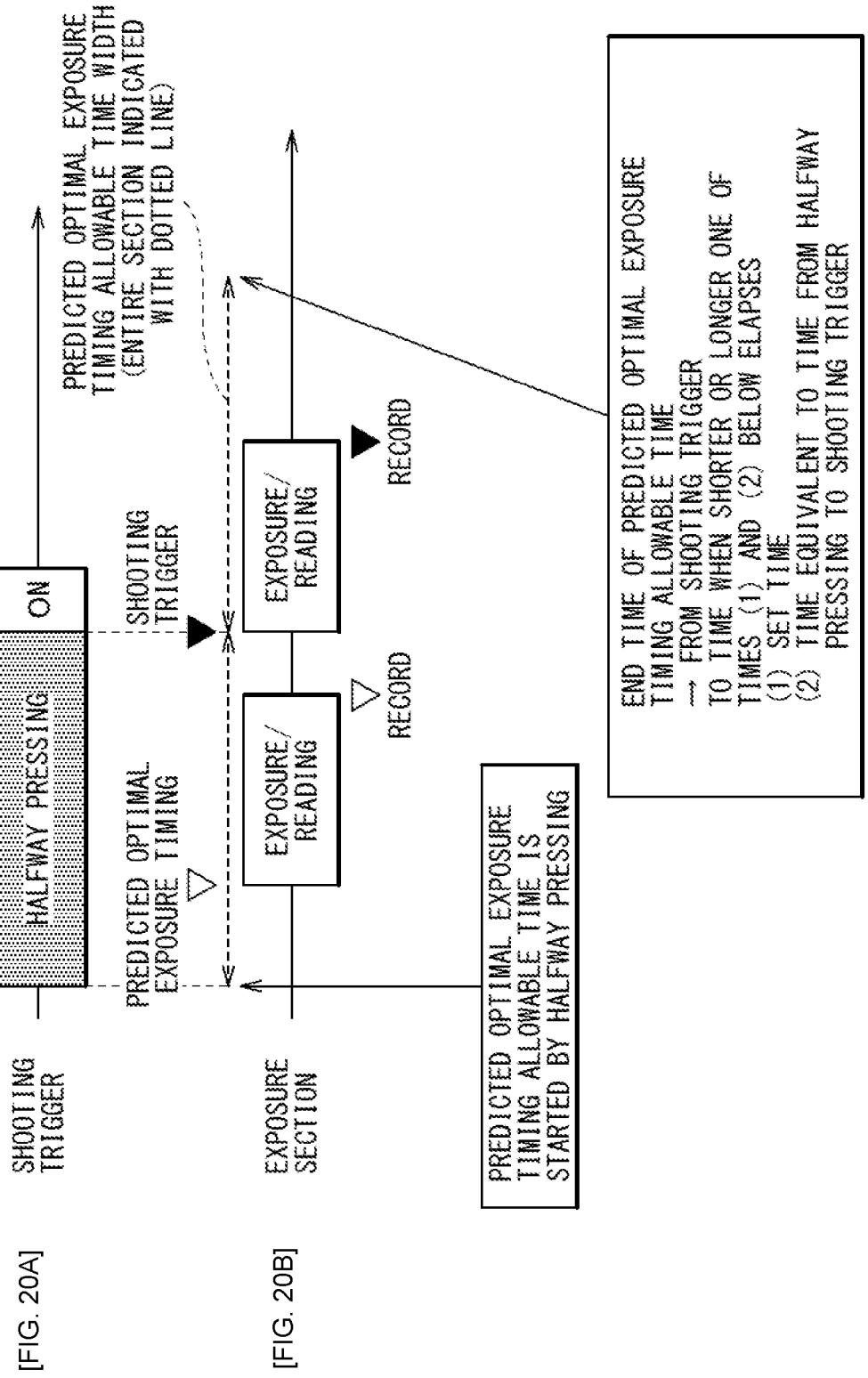

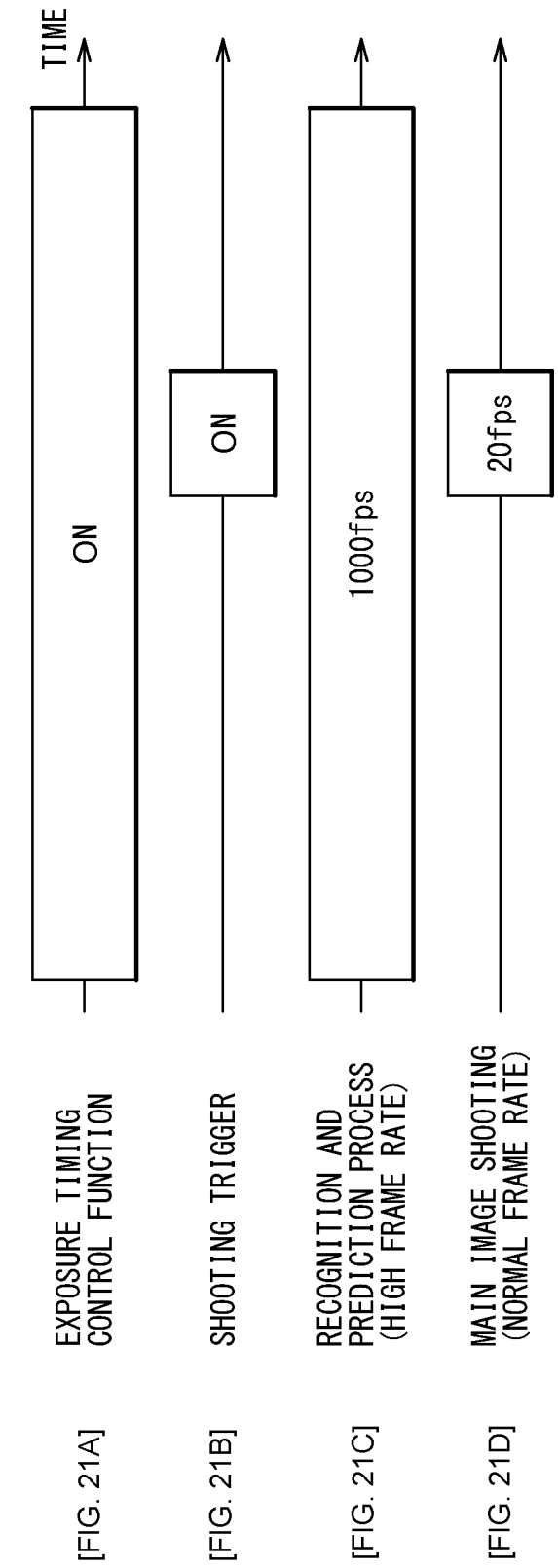

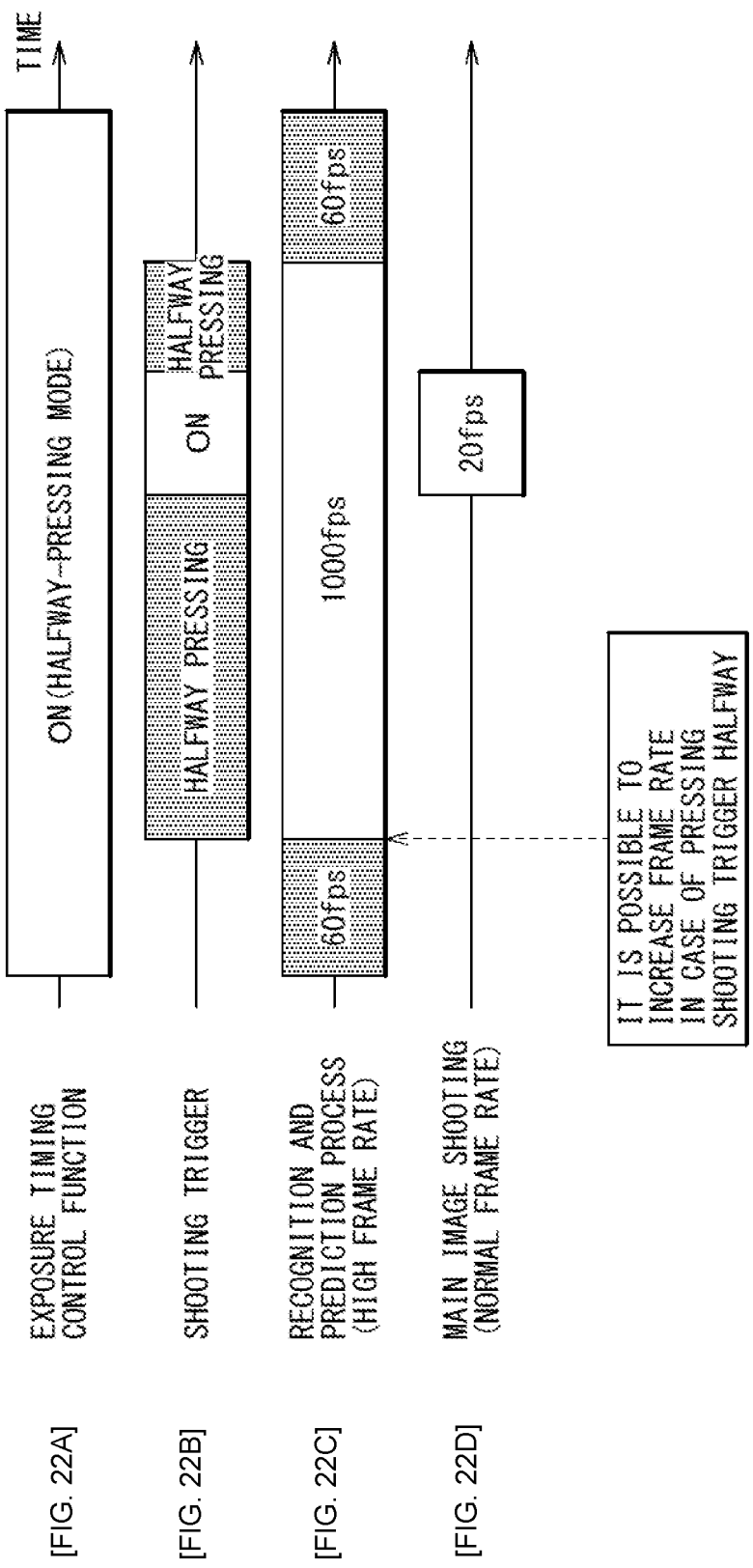

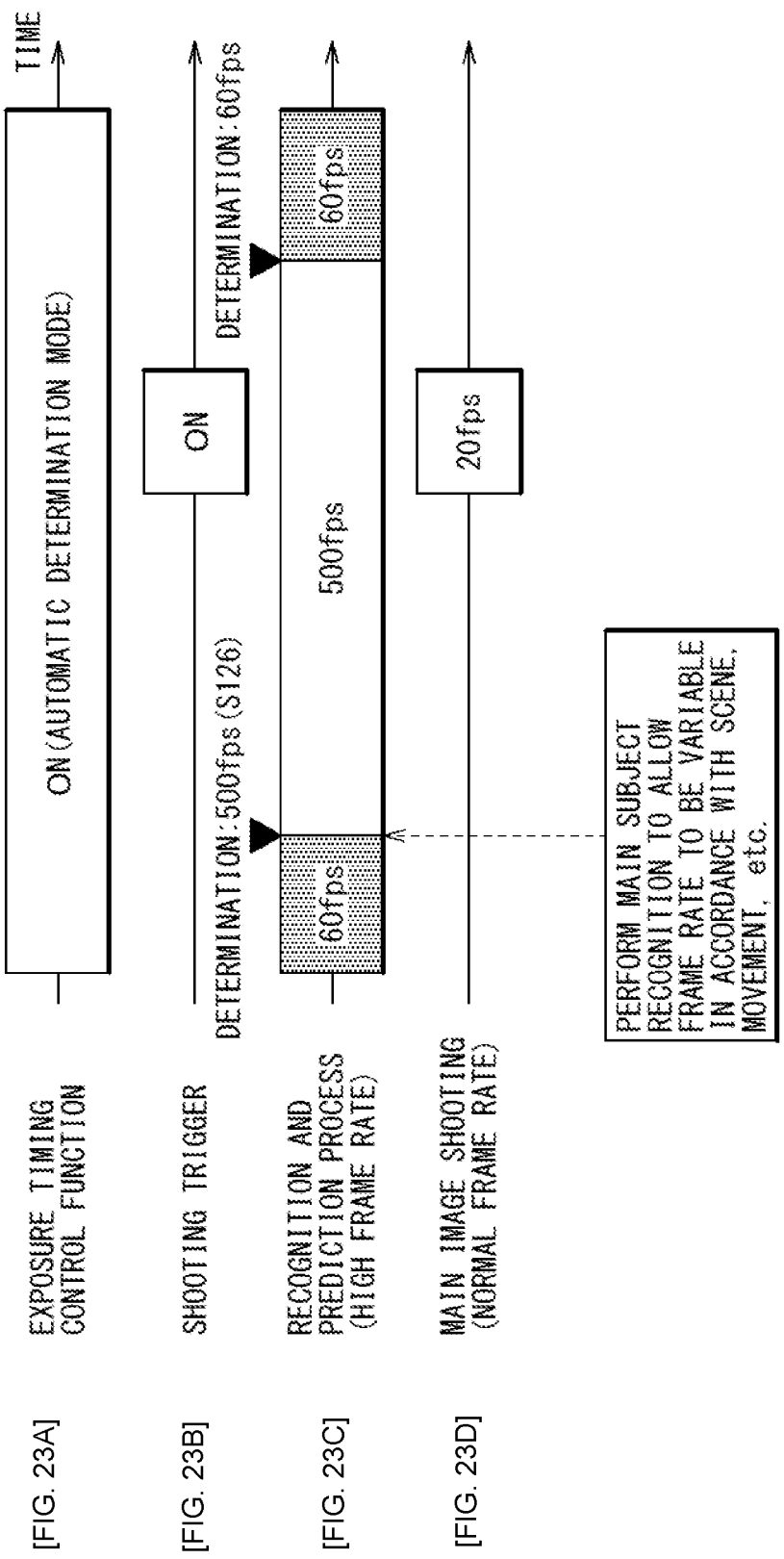

[FIG. 24]
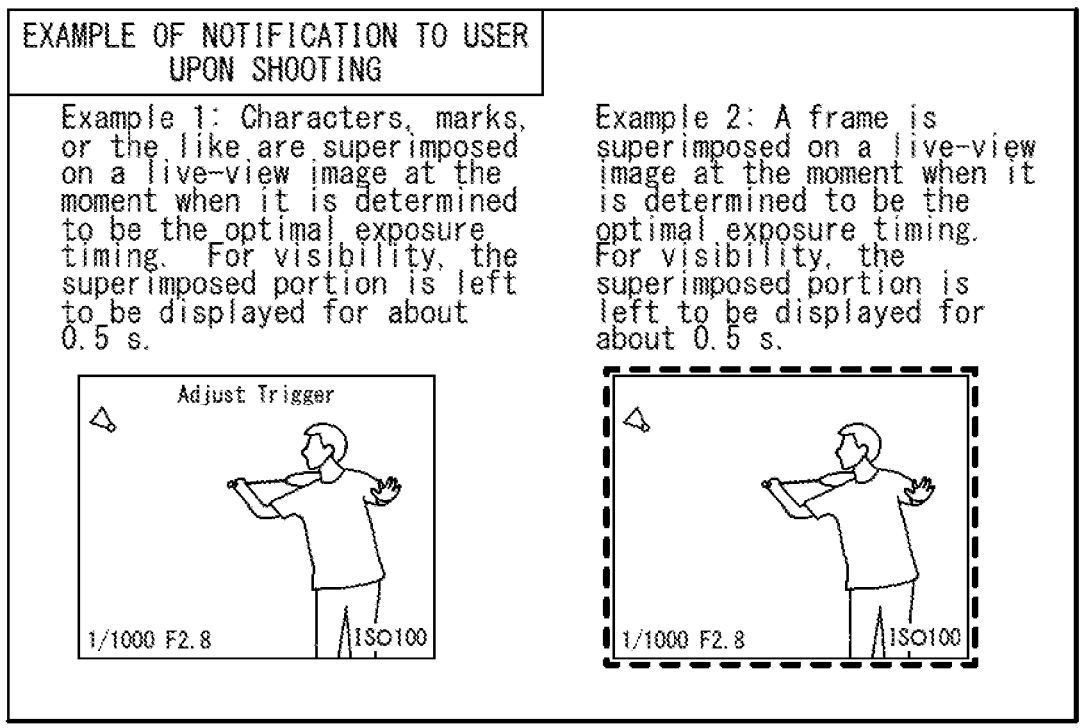

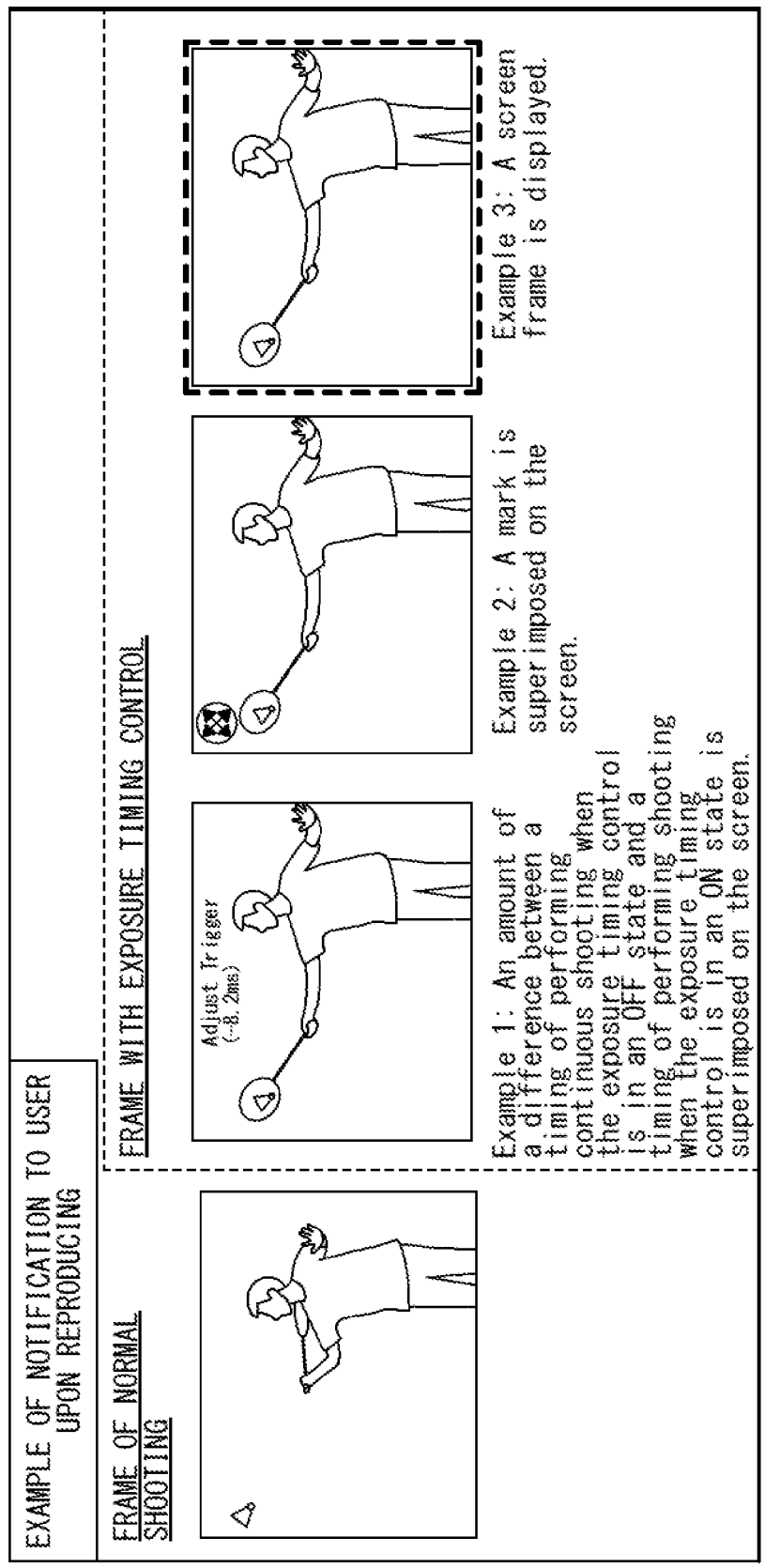

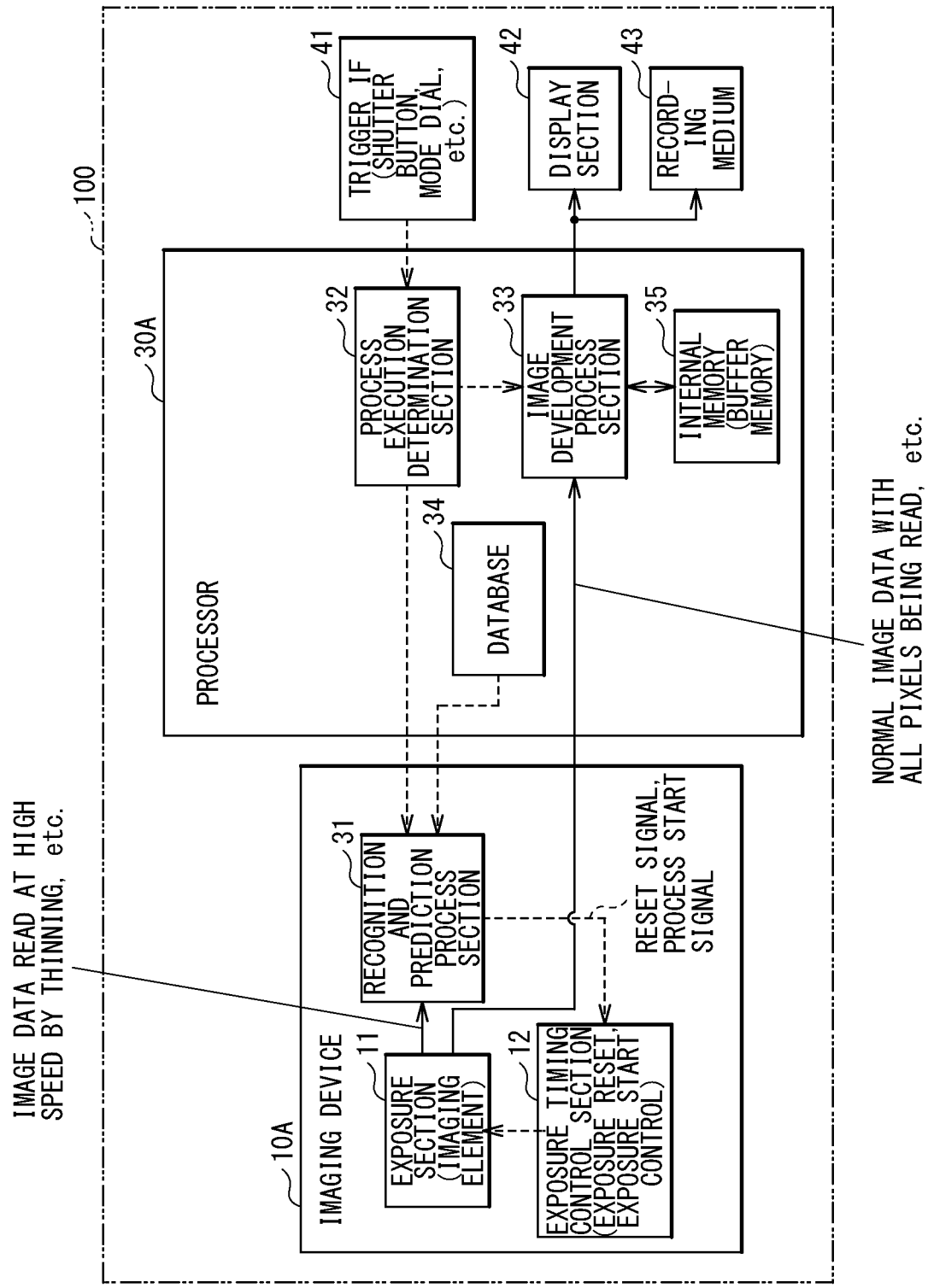
[FIG. 26]

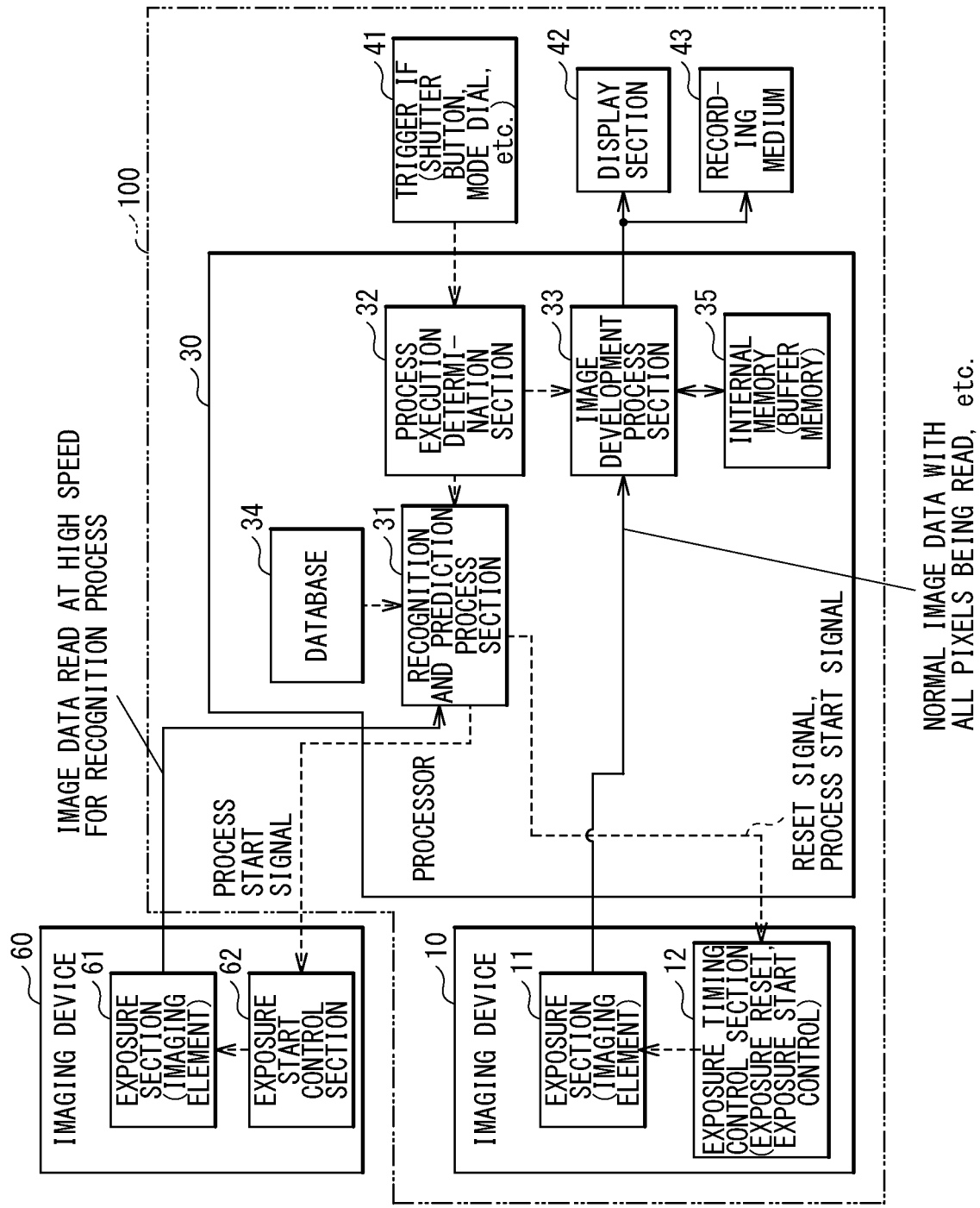
[FIG. 27]

IMAGING DEVICE AND IMAGING CONTROL METHOD

CROSS REFERENCE TO RELATED APPLICATIONS

This application is a U.S. National Phase of International Patent Application No. PCT/JP2020/022355 filed on Jun. 5, 2020, which claims priority benefit of Japanese Patent Application No. JP 2019-110548 filed in the Japan Patent Office on Jun. 13, 2019. Each of the above-referenced applications is hereby incorporated herein by reference in its entirety.

TECHNICAL FIELD

The present disclosure relates to an imaging device, an imaging control method, and a program.

BACKGROUND ART

An imaging device with a function of performing pixel thinning or adding is being developed (see PTL 1). Further, there is an imaging device that performs pixel thinning to thereby allow for shooting at a high frame rate. This makes it possible to perform shooting of a subject moving at a high speed.

CITATION LIST

Patent Literature

PTL 1: Japanese Unexamined Patent Application Publication No. 2018-19191

SUMMARY OF THE INVENTION

An imaging device that allows for shooting at a high frame rate typically has lower image quality. It is difficult to perform shooting of a subject moving at a high speed with high image quality and at a desired timing.

It is desirable to provide an imaging device, an imaging control method, and a program that allow for shooting of a subject moving at a high speed with high image quality and at a desired timing.

An imaging device according to an embodiment of the present disclosure includes an exposure section and a controller. The controller controls, at an exposure timing based on a predicted exposure timing at which a state of a subject shot at a first frame rate is predicted to satisfy a predetermined condition, the exposure section at a second frame rate. The second frame rate is different from the first frame rate.

An imaging control method according to an embodiment of the present disclosure includes: shooting, with an imaging device including an exposure section, a subject at a first frame rate; and controlling, at an exposure timing based on a predicted exposure timing at which a state of the subject shot at the first frame rate is predicted to satisfy a predetermined condition, the exposure section at a second frame rate, the second frame rate being different from the first frame rate.

A program according to an embodiment of the present disclosure causes a computer to execute processes including: shooting, with an imaging device including an exposure section, a subject at a first frame rate; and controlling, at an exposure timing based on a predicted exposure timing at which a state of the subject shot at the first frame rate is predicted to satisfy a predetermined condition, the exposure section at a second frame rate, the second frame rate being different from the first frame rate.

In the imaging device, the imaging control method, or the program according to the embodiment of the present disclosure, the exposure timing of the exposure section is controlled to allow shooting of the subject to be performed at the predicted optimal exposure timing.

BRIEF DESCRIPTION OF DRAWINGS

FIG. 1 is a block diagram illustrating an outline of a configuration of a camera to which an imaging device according to a first embodiment of the present disclosure is to be applied.

FIG. 2 is an explanatory diagram illustrating an example of a shooting scene which is difficult to shoot at a normal exposure timing.

FIGS. 3A, 3B, and 3C are explanatory diagram illustrating an outline of operation of a camera according to the first embodiment.

FIG. 4 is an explanatory diagram illustrating the outline of the operation of the camera according to the first embodiment.

FIG. 5 is a flowchart illustrating an example of an operation flow of a recognition and prediction process by the camera according to the first embodiment.

FIG. 6 is a flowchart illustrating an example of an operation flow of a normal imaging process by the camera according to the first embodiment in a continuous shooting mode or a moving image mode.

FIG. 7 is a timing chart illustrating an example of an exposure timing of the camera according to the first embodiment in the continuous shooting mode or the moving image mode.

FIG. 8 is a flowchart illustrating an example of an operation flow of the recognition and prediction process by the camera according to the first embodiment in an automatic determination mode.

FIG. 9 is a flowchart illustrating a first specific example of an operation flow of the recognition and prediction process by the camera according to the first embodiment.

FIG. 10 is a flowchart illustrating a second specific example of the operation flow of the recognition and prediction process by the camera according to the first embodiment.

FIG. 11 is an explanatory diagram illustrating an example of data content of a database to be used in the recognition and prediction process by the camera according to the first embodiment.

FIG. 12 is an explanatory diagram illustrating an example of the database following FIG. 11.

FIG. 13 is a flowchart illustrating an example of an operation flow of an imaging process by the camera according to the first embodiment in a case where a single shooting mode, in particular, a predicted optimal exposure timing priority mode is selected.

FIG. 14 is a flowchart following FIG. 13.

FIG. 15 is a flowchart illustrating an example of an operation flow of the imaging process by the camera according to the first embodiment in a case where the single shooting mode, in particular, a shooting trigger priority mode is selected.

FIG. 16 is a flowchart following FIG. 15.

FIGS. 17A and 17B are timing charts illustrating an outline of an exposure timing and an image data reading timing of the camera according to the first embodiment in the single shooting mode.

FIGS. 18A and 18B are timing charts illustrating examples of an exposure timing and an image data reading timing of the camera according to the first embodiment in a case where the single shooting mode, in particular, the predicted optimal exposure timing priority mode is selected.

FIGS. 19A and 19B are timing charts illustrating examples of an exposure timing and an image data reading timing of the camera according to the first embodiment in a case where the single shooting mode, in particular, the shooting trigger priority mode is selected.

FIGS. 20A and 20B are timing charts illustrating an example of a control of a predicted optimal exposure timing allowable time by halfway-pressing in the single shooting mode.

FIGS. 21A, 21B, 21C, and 21D are timing charts illustrating examples of timings related to the exposure timing control function, a shooting trigger, the recognition and prediction process, and a main image shooting of the camera according to the first embodiment.

FIGS. 22A, 22B, 22C, and 22D are timing charts illustrating a first example of the timings related to the exposure timing control function, the shooting trigger, the recognition and prediction process, and the main image shooting of the camera according to the first embodiment in a case where a frame rate of the recognition and prediction process is suppressed.

FIGS. 23A, 23B, 23C, and 23D are timing charts illustrating a second example of the timings related to the exposure timing control function, the shooting trigger, the recognition and prediction process, and the main image shooting of the camera according to the first embodiment in a case where the frame rate of the recognition and prediction process is suppressed.

FIG. 24 is an explanatory diagram illustrating an example of notification to a user in a case where it is determined that it is an optimal exposure timing upon shooting by the camera according to the first embodiment.

FIG. 25 is an explanatory diagram illustrating an example of notifying the user that shooting has been performed at the optimal exposure timing upon reproducing an image shot by the camera according to the first embodiment.

FIG. 26 is a block diagram illustrating an outline of a configuration of a camera to which an imaging device according to a second embodiment is to be applied.

FIG. 27 is a block diagram illustrating an outline of a configuration of a camera to which an imaging device according to a third embodiment is to be applied.

MODES FOR CARRYING OUT THE INVENTION

In the following, embodiments of the present disclosure are described in detail with reference to the drawings. It is to be noted that the descriptions will be given in the following order.

1. First Embodiment (FIGS. 1, 2, 3A, 3B, 3C, 4, 5, 6, 7, 8, 9, 10, 11, 12, 13, 14, 15, 16, 17A, 17B, 18A, 18B, 19A, 19B, 20A, 20B, 21A, 21B, 21C, 21D, 22A, 22B, 22C, 22D, 23A, 23B, 23C, 23D, 24, and 25)
   1.1 Configuration of Camera According to First Embodiment
   1.2 Operation of Camera According to First Embodiment
   1.3 Effects and Modifications 2. Second Embodiment (FIG. 26)
3. Third Embodiment (FIG. 27)
4. Other Embodiments

1. First Embodiment

[1.1 Configuration of Camera According to First Embodiment]

FIG. 1 illustrates an outline of a configuration of a camera to which an imaging device according to a first embodiment of the present disclosure is to be applied.

The camera according to the first embodiment includes an imaging device 10, a processor 30, a trigger IF (interface) 41, a display section 42, and a recording medium 43 in a camera body 100. The trigger IF 41, the display section 42, and the recording medium 43 may be configured separately from the camera body 100. In addition, the camera according to the first embodiment may include a lens section that forms an optical image of a subject.

The imaging device 10 includes an exposure section 11 and an exposure timing control section 12. The processor 30 includes a recognition and prediction process section 31, a process execution determination section 32, an image development process section 33, a database 34, and an internal memory 35. The exposure timing control section 12 corresponds to a specific example of a "controller" in the technology of the present disclosure. Further, in addition to the exposure timing control section 12, at least one of the recognition and prediction process section 31, the process execution determination section 32, or the image development process section 33 may be included in the "controller" in the technology of the present disclosure.

The trigger IF 41 includes, for example, a shooting trigger (shutter button) that instructs the exposure section 11 to perform shutter operation. Further, the trigger IF 41 includes a mode dial, a function selection button, and the like. The camera according to the first embodiment is configured to perform, for example, selection of various modes at the time of shooting such as selection of a continuous shooting mode, a moving image mode, or a single shooting mode, and to configure various settings at the time of shooting and the like, with use of a mode dial, a function selection button, or the like. Further, the camera according to the first embodiment is configured to configure an ON/OFF setting of the exposure timing control function with use of the mode dial, the function selection button, or the like.

It is to be noted that, in general, the shutter button of the camera as the shooting trigger has a halfway-pressing function which allows for starting some kind of function by pressing the button about halfway. Further, in general, regarding a camera, a shooting-related function can be assigned, for example, to another button provided on a housing of the camera. In the camera according to the first embodiment, instead of pressing the shutter button halfway, for example, the halfway-pressing function may be achieved by pressing the other button provided on the housing of the camera. Further, the button for achieving the halfway-pressing function may be a button dedicated to the halfway-pressing function.

The exposure section 11 includes an imaging element such as a CCD (Charge Coupled Device) or a CMOS (Complementary Metal Oxide Semiconductor). The exposure section 11 performs shooting of a subject and outputs an imaging signal. The exposure section 11 is configured to perform continuous shooting and moving-image shooting at a second frame rate (e.g., 20 fps) on the basis of a timing when the shutter button is turned on (see operation in FIGS. 3A, 3B, 3C, 4, 5, 6, and 7 which will be described later).

Further, the exposure section 11 is configured to perform single shooting on the basis of the timing when the shutter button is turned on (see FIGS. 13 to 16 and FIGS. 17A, 17B, 18A, 18B, 19A, 19B, 20A, and 20B which will be described later).

The image development process section 33 generates image data suitable to record in the internal memory 35 and the recording medium 43 on the basis of the imaging signal from the exposure section 11. Further, the image development process section 33 generates image data suitable to display on the display section 42 on the basis of the imaging signal from the exposure section 11. The imaging signal supplied from the exposure section 11 to the image development process section 33 is normal image data with all pixels being read. The normal image data is image data obtained by performing shooting at a normal second frame rate (e.g., 20 fps), for example, in the continuous shooting mode or the moving image mode. Further, the normal image data is image data obtained by performing single shooting, for example, in the single shooting mode.

The recognition and prediction process section 31 recognizes the movement of the subject and predicts an optimal exposure timing at which the state of the subject becomes a predetermined state. Hereinafter, the optimal exposure timing predicted by the recognition and prediction process section 31 is also referred to as a "predicted optimal exposure timing" or a "predicted exposure timing". The predetermined state is, for example, a state in which the state of the subject becomes that at the moment of an impact illustrated in FIG. 2, or those at the moments of specific examples in FIGS. 11 and 12 which will be described later. The recognition and prediction process section 31 performs the recognition and prediction process on the basis of the imaging signal from the exposure section 11. However, it is desirable that the recognition and prediction process be performed at a high speed. Therefore, it is desirable that the recognition and prediction process section 31 receive image data read at a high speed by pixel thinning or the like. The image data read at a high speed is image data obtained by performing continuous shooting at a first frame rate (e.g., 1000 fps) which is higher than the normal second frame rate. The recognition and prediction process section 31 controls the exposure timing control section 12 on the basis of results of recognition and prediction to achieve a control in the operation mode set with the trigger IF 41 or the like. The recognition and prediction process section 31 supplies, to the exposure timing control section 12, a reset signal instructing to reset exposure performed by the exposure section 11 and a process start signal instructing to start exposure to be performed by the exposure section 11.

The recognition and prediction process section 31 recognizes the movement of the subject, for example, on the basis of a timing at which the exposure timing control function is turned on, and predicts the optimal exposure timing at which the state of the subject becomes the predetermined state (see FIGS. 5, 8, 21A, 21B, 21C, 21D, 22A, 22B, 22C, 22D, 23A, 23B, 23C, and 23D, and the like which will be described later).

Further, the recognition and prediction process section 31 recognizes the movement of the subject and predicts the optimal exposure timing at which the state of the subject becomes the predetermined state, on the basis of a timing at which the shutter button is pressed halfway, for example, in the single shooting mode.

The database 34 stores various pieces of data for the recognition and prediction process by the recognition and prediction process section 31 (for example, it stores content in FIGS. 11 and 12 which will be described later).

The exposure timing control section 12 controls the exposure section 11 at a second frame rate at an exposure timing based on the predicted exposure timing. The second frame rate is different from the first frame rate. The predicted exposure timing is a timing at which the state of the subject shot at the first frame rate is predicted to satisfy a predetermined condition. Further, the predicted exposure timing is a timing at which the predicted movement of the subject satisfies a predetermined state, in a case where the recognition and prediction process section 31 has predicted the movement of the subject on the basis of the movement of the subject shot at the first frame rate. For example, the exposure timing control section 12 controls the exposure section 11 to cause the exposure timing to match the predicted exposure timing in the continuous shooting mode, the moving image mode, or the like.

Further, the exposure timing control section 12 controls the exposure timing of the exposure section 11 on the basis of the predicted exposure timing and the shooting trigger in the single shooting mode, for example. For example, the exposure timing control section 12 controls the exposure timing of the exposure section 11 in accordance with a time difference between the predicted exposure timing and the shooting trigger in a case where the predicted exposure timing is within a predetermined period based on the shooting trigger in the single shooting mode. The predetermined period as used herein refers to a "predicted optimal exposure timing allowable time" which will be described later (see FIGS. 13, 14, 15, 16, 17A, 17B, 18A, 18B, 19A, 19B, 20A, and 20B, and the like which will be described later). The predetermined period is set, for example, in accordance with a user operation. The user operation is, for example, an operation of pressing the shutter button halfway, or an operation on another button to which a half-pressing function is assigned. Further, the exposure timing control section 12 controls the exposure timing of the exposure section 11 in accordance with the time difference between the predicted exposure timing and the shooting trigger in a case where the predicted exposure timing is within the predetermined period based on the shooting trigger in the single shooting mode (see FIGS. 13, 14, 15 16, 17A, 17B, 18A, 18B, 19A, 19B, 20A and 20B, and the like which will be described later).

The exposure timing control section 12 causes the exposure section 11 to start shooting at the first frame rate in accordance with an instruction from the user. Here, the instruction from the user corresponds to turning on the exposure timing control function, for example, with use of a mode dial, a function selection button, or the like of the trigger IF 41.

The exposure timing control section 12 causes the exposure section 11 to perform shooting for predicting the state of the subject at a frame rate different from the first frame rate in accordance with a predetermined determination condition. As used herein, the predetermined determination condition refers to, for example, a condition based on the user operation, and is, for example, a condition based on the operation of pressing the shutter button halfway or the operation on another button to which the half-pressing function is assigned (see FIGS. 22A, 22B, 22C, and 22D which will be described later). Further, the predetermined determination condition may be a condition based on the state of the subject (see FIGS. 8, 23A, 23B, 23C, and 23D which will be described later).

It is to be noted that the recognition and prediction process on the state of the subject by the recognition and prediction process section 31 may be started on the basis of the user operation on a first operation member. The predetermined determination condition may be a condition based on the user operation on a second operation member. As used herein, the user operation on the first operation member may refer to, for example, one of the operation of pressing the shutter button halfway and the operation on another button to which the half-pressing function is assigned. Further, the user operation on the second operation member may be, for example, the other of the operation of pressing the shutter button halfway and the operation on the other button to which the half-pressing function is assigned.

The exposure timing control section 12 controls the exposure timing of the exposure section 11 to cause shooting of the subject to be performed at the optimal exposure timing predicted by the recognition and prediction process section 31. The exposure timing control section 12 causes the exposure section 11 to reset the exposure on the basis of the reset signal from the recognition and prediction process section 31. Further, the exposure timing control section 12 causes the exposure section 11 to start the exposure on the basis of the process start signal from the recognition and prediction process section 31.

In a case where the optimal exposure timing is predicted by the recognition and prediction process section 31, the exposure timing control section 12 controls the exposure timing of the exposure section 11 to reset the exposure performed by the exposure section 11 and cause the exposure to be started from the optimal exposure timing. For example, in a case where the optimal exposure timing is predicted by the recognition and prediction process section 31 in the continuous shooting mode, the moving image mode, or the like, the exposure timing control section 12 varies a phase of the exposure timing of the exposure section 11 without varying the frame rate (see FIGS. 3A, 3B, 3C, 3D, 4, 6, and 7, and the like which will be described later).

The process execution determination section 32 causes the recognition and prediction process section 31 and the image development process section 33 to execute various processes in the operation mode set with use of the trigger IF 41, on the basis of the trigger signal from the trigger IF 41.

The display section 42 includes, for example, a liquid crystal display, an organic (Electro Luminescence) display or the like. The display section 42 displays already-shot image data, a live-view image of the subject currently being shot, or the like.

The camera according to the first embodiment may include a notification section that makes notification that the shooting of the subject has been performed at the exposure timing based on the predicted exposure timing. The notification section may be, for example, the display section 42. The display section 42 may perform live-view display of the subject to be shot by the exposure section 11 and may display a notification indicating that it is the optimal exposure timing in association with the image of the live-view display in a case where it is the optimal exposure timing predicted by the recognition and prediction process section 31 (see FIG. 24 which will be described later). Further, the display section 42 may display a notification indicating that it is the image data obtained at the optimal exposure timing in association with the image data obtained by performing shooting of the subject at the optimal exposure timing (see FIG. 25 which will be described later).

At least one of the internal memory 35 or the recording medium 43 corresponds to a specific example of a "storage section" in the technology of the present disclosure.

The internal memory 35 is a buffer memory that temporarily stores image data shot by the exposure section 11. The internal memory 35 temporarily stores, for example, image data shot at a timing when the shutter button is turned on or at the optimal exposure timing in the single shooting mode (see FIGS. 13, 14, 15, 16, 17A, 17B, 18A, 18B, 19A, 19B, 20A, and 20B, and the like which will be described later).

The recording medium 43 is a recording medium in which the shot image data can be recorded, for example, a semiconductor recording device or the like. The recording medium 43 may be of a built-in type to be provided inside the camera body 100, or may be an external recording medium of a card type or the like that is attachable to and detachable from the inside of the camera body 100.

In the camera according to the first embodiment, the exposure timing control section 12 and the processor 30 may each include a microcomputer including, for example, a CPU (Central Processing Unit), a ROM (Read Only Memory), and a RAM (Random Access Memory). In this case, the process to be performed by the exposure timing control section 12 and the processor 30 can be achieved by the CPU executing a process based on a program stored in the ROM or the RAM. Further, the process to be performed by the exposure timing control section 12 and the processor 30 may be achieved by the CPU executing a process based on a program received, for example, from the outside via a wired or wireless network.

[1.2 Operation of Camera According to First Embodiment]

In the following, a description is given of distinctive operation of the camera according to the first embodiment, mainly of the recognition and prediction process by the recognition and prediction process section 31 and the operation of the exposure timing control by the exposure timing control section 12.

FIG. 2 illustrates an example of a shooting scene that is difficult to shoot at a normal exposure timing.

In the current situation, a usual camera cannot secure a sufficient frame rate for a subject moving at a high speed, for example, in a still-image continuous shooting mode, which prevents capturing an important moment. For example, as illustrated in FIG. 2, in order to shoot a moment of impact in boxing, a moment of a smash or an impact in badminton, and the like, a frame rate of about 500 fps to 800 fps is necessary for the former case, and a frame rate of about 1000 fps is necessary for the latter case.

FIGS. 3A, 3B, 3C, and 4 illustrate an outline of the recognition and prediction process and the operation of the exposure timing control by the camera according to the first embodiment.

In FIGS. 3A, 3B, 3C, and 4, the camera performs, for example, shooting in a normal continuous shooting mode with high image quality of 20 fps. In this case, the camera cannot fully capture the important moment at a still-image shooting interval in the normal continuous shooting mode. For example, the example in FIGS. 3A, 3B, and 3C are scene (scene) of playing badminton, in which a subject 71 (player) and a subject 72 (shuttlecock) are present. In this case, for example, the moment of the smash or the impact in playing badminton cannot be captured. Therefore, the recognition and prediction process section 31 predicts the moment of the smash or the impact in playing badminton as the optimal exposure timing, for example, on the basis of the image data read at a high speed of 1000 fps. The recognition and prediction process section 31 supplies a reset signal and a process start signal to the exposure timing control section 12 to cause the exposure section 11 to reset the exposure at the optimal exposure timing and to start exposure at a new exposure timing. The exposure timing control section 12 causes the exposure section 11 to reset the exposure on the basis of the reset signal from the recognition and prediction process section 31. Further, the exposure timing control section 12 causes the exposure section 11 to start the exposure from the optimal exposure timing on the basis of the process start signal from the recognition and prediction process section 31. The exposure timing control section 12 varies (updates) the phase of the exposure timing of the exposure section 11 without varying the frame rate. As described above, the camera according to the first embodiment resets the current exposure timing, and adjusts the exposure timing to resume the exposure from the optimal exposure timing. This allows for shooting without missing the important moment beyond the continuous shooting speed. This makes it possible for the camera to comprehend the optimal exposure timing within between the continuous shooting intervals and update the continuous shooting phase.

In the following, a specific operation flow is described.

(Basic Operation of Recognition and Prediction Process)

FIG. 5 illustrates an example of an operation flow of the recognition and prediction process by the camera according to the first embodiment. The recognition and prediction process may be operation common to the continuous shooting mode, the single shooting mode, and the moving image mode.

First, the exposure timing control function is turned on at the trigger IF 41 (step S101). Thereafter, the exposure section 11 performs exposure and reads image data at a high speed for the recognition and prediction process (step S102). Thereafter, the recognition and prediction process section 31 recognizes a main subject (recognizes the posture of the subject, recognizes an object, etc.) on the basis of the image data read at the high speed (step S103). Thereafter, the recognition and prediction process section 31 performs a process of predicting the optimal exposure timing on the basis of the image data read at the high speed (step S104).

Thereafter, the recognition and prediction process section 31 determines whether or not it has become the predicted optimal exposure timing (step S105). In a case where it is determined that it has not become the predicted optimal exposure timing yet (step S105; N), the recognition and prediction process section 31 causes the process to return to step S102. In contrast, in a case where it is determined that it has become the predicted optimal exposure timing (step S105; Y), the recognition and prediction process section 31 generates a predicted optimal exposure timing signal as an interrupt signal (a reset signal or a process start signal) (step S106), and causes the process to return to step S102.

(Operation of Imaging Process in Continuous Shooting/Moving Image Mode)

FIG. 6 illustrates an example of an operation flow of a normal imaging process (an imaging process not by high-speed reading but by normal all-pixel reading) by the camera according to the first embodiment in the continuous shooting mode or the moving image mode.

First, the exposure timing control function is turned on, the continuous shooting mode or the moving image mode is selected, and the shooting trigger (shutter button) is turned on at the trigger IF 41 (step S111). Thereafter, the exposure section 11 starts normal exposure (exposure not for high-speed reading but for normal all-pixel reading) (step S112).

Thereafter, the exposure timing control section 12 determines whether or not an interrupt by the predicted optimal exposure timing signal is present as an interrupt signal (the reset signal or the process start signal) from the recognition and prediction process section 31 (step S113). In a case where it is determined that the predicted optimal exposure timing signal is present (step S113; Y), the exposure timing control section 12 resets the exposure or the reading performed by the exposure section 11 (step S114), and causes the exposure section 11 to start normal exposure at a new timing (step S112).

In contrast, in a case where it is determined that the predicted optimal exposure timing signal is absent (step S113; N), the exposure timing control section 12 thereafter causes the exposure section 11 to end the exposure and read image data by all-pixel reading (step S115). Thereafter, the exposure timing control section 12 determines whether or not an interrupt by the predicted optimal exposure timing signal is present as an interrupt signal (the reset signal or the process start signal) from the recognition and prediction process section 31 (step S116).

In a case where it is determined that the interrupt is present (step S116; Y), the exposure timing control section 12 causes the process to proceed to step S114 described above. In contrast, in a case where it is determined by the exposure timing control section 12 that the interrupt by the predicted optimal exposure timing signal is absent (step S116; N), the process returns to step S122, and after the reading of the image data is completed, the image development process section 33 performs the image development process on the read image data (step S117). Thereafter, the image development process section 33 records the image data (stores the image) in the internal memory 35 or the recording medium 43 (step S118).

FIG. 7 illustrates an example of an exposure timing in the continuous shooting mode or the moving image mode of the camera according to the first embodiment.

As illustrated in FIG. 7, in the camera according to the first embodiment, in a case where the predicted optimal exposure timing occurs while exposure is being performed or image data is being read at the timing of the shooting trigger based on the continuous shooting frame rate (e.g., 20 fps) in the continuous shooting mode, the exposure or the reading of the image data is reset, and the exposure section 11 is caused to start exposure based on the predicted optimal exposure timing. Thus, the phase of the exposure timing of the exposure section 11 is varied without varying the continuous shooting frame rate. This is similarly applicable to the moving image mode.

(Operation of Recognition and Prediction Process in Automatic Determination Mode)

FIG. 8 illustrates an example of an operation flow of the recognition and prediction process in an automatic determination mode of the camera according to the first embodiment. The camera according to the first embodiment has the automatic determination mode in which the camera side automatically determines whether or not the exposure timing control is necessary. The operation in the automatic determination mode may be operation common to the continuous shooting mode, the single shooting mode, and the moving image mode. The operation flow illustrated in FIG. 8 corresponds to, for example, a timing chart in FIGS. 23A, 23B, 23C, and 23D which will be described later.

First, the exposure timing control function is turned on and the automatic determination mode is selected at the trigger IF 41 (step S121). In the automatic determination mode, the exposure timing control section 12 first sets the speed of reading the image data for the recognition and prediction process to a relatively low speed (e.g., 60 fps) (step S122). Thereafter, the exposure section 11 performs exposure of the image (step S123). Thereafter, the recognition and prediction process section 31 recognizes the main subject (recognizes a posture of the subject, recognizes an object, etc.) on the basis of the image data read at the relatively low speed (step S124). Thereafter, the recognition and prediction process section 31 determines whether or not the exposure timing control is necessary (step S125). This determination is made in accordance with, for example, the speed of the subject, the scene, and the like. For example, it is performed on the basis of whether or not the subject is a target of the object recognition described in a specific example (FIGS. 9 to 12) of the recognition and prediction process which will be described later. In a case where it is determined that the exposure timing control is not necessary (step S125; N), the recognition and prediction process section 31 causes the process to return to step S122.

In contrast, in a case where it is determined by the recognition and prediction process section 31 that the exposure timing control is necessary (step S125; Y), the exposure timing control section 12 sets the speed of reading the image data for the recognition and prediction process to a relatively low speed (e.g., 60 fps) or a high speed (e.g., from 500 fps to 1000 fps) in accordance with the scene of the subject and the like (step S126). Thereafter, the recognition and prediction process section 31 performs a process of predicting the optimal exposure timing on the basis of the read image data (step S127).

Thereafter, the recognition and prediction process section 31 determines whether or not it has become the predicted optimal exposure timing (step S128). In a case where it is determined that it has not become the predicted optimal exposure timing yet (step S128; N), the recognition and prediction process section 31 causes the process to return to step S123. In contrast, in a case where it is determined that it has become the predicted optimal exposure timing (step S128; Y), the recognition and prediction process section 31 generates a predicted optimal exposure timing signal as an interrupt signal (the reset signal or the process start signal) (step S129), and causes the process to return to step S123.

(Specific Example of Recognition and Prediction Process)

FIG. 9 illustrates a first specific example of the operation flow of the recognition and prediction process by the camera according to the first embodiment.

FIG. 9 illustrates specific examples of processes corresponding to steps S103 and S104 in the operation flow of FIG. 5 and steps S124 and S127 in the operation flow of FIG. 8.

FIG. 9 illustrates, as examples of the scenes to be shot, a case of sports (tennis, etc.), a case of shooting a human, a case of shooting an animal, and other cases.

In the case of scenes of sports (tennis, etc.), the recognition and prediction process section 31 first performs object recognition, for example, recognition of humans, tools, balls, etc. (step S211). Thereafter, the recognition and prediction process section 31 performs estimation of a posture of a human body (step S212). Thereafter, the recognition and prediction process section 31 performs prediction of a motion of a target of prediction (e.g., the posture of the human body, the movement of the object, etc.) (step S213). Thereafter, the recognition and prediction process section 31 performs impact determination (step S214).

In the case of a scene of shooting a human, first, the recognition and prediction process section 31 performs recognition of a human as the object recognition (step S221).

Thereafter, the recognition and prediction process section 31 performs the estimation of the posture of the human body (step S222). Thereafter, the recognition and prediction process section 31 performs prediction of a change in shape of the posture of the target of prediction (step S223). Thereafter, the recognition and prediction process section 31 performs determination of matching between it and the posture at the peak (step S224).

In the case of a scene of shooting an animal, first, the recognition and prediction process section 31 performs recognition of a kind of the animal as the object recognition (step S231). Thereafter, the recognition and prediction process section 31 performs estimation of a posture of the animal (step S232). Thereafter, the recognition and prediction process section 31 performs prediction of a change in shape of a posture of the target of prediction (step S233). Thereafter, the recognition and prediction process section 31 performs determination of a steep motion change timing (step S234).

In the case of other scenes, first, the recognition and prediction process section 31 performs the object recognition (step S241). Thereafter, the recognition and prediction process section 31 extracts features such as a composition (step S242). Thereafter, the recognition and prediction process section 31 performs determination of matching with a dictionary (database) of the optimal exposure timings held in advance (step S243).

FIG. 10 illustrates a second specific example of the operation flow of the recognition and prediction process by the camera according to the first embodiment.

In the operation flow of FIG. 10, the user designates the target of recognition and a border line in advance with use of a UI (user interface) of the camera (step S300).

The recognition and prediction process section 31 recognizes the object designated by the user (step S301). Thereafter, the recognition and prediction process section 31 determines whether or not the recognized object is a human, an animal, or the like (step S302).

In a case where it is determined that the recognized object is a human, an animal, or the like (step S302; Y), the recognition and prediction process section 31 thereafter estimates the posture of the human, the animal, or the like (step S303). Thereafter, the recognition and prediction process section 31 predicts a change in shape of the posture (step S304). Thereafter, the recognition and prediction process section 31 determines whether the human, the animal, or the like crosses the border line designated by the user (step S307).

In contrast, in a case where it is determined that the recognized object is not a human, an animal, or the like (step S302; N), the recognition and prediction process section 31 thereafter estimates the shape of the target of recognition (step S305). Thereafter, the recognition and prediction process section 31 predicts the motion of the target of recognition (step S306). Thereafter, the recognition and prediction process section 31 determines whether the target of recognition crosses the border line designated by the user (step S307).

FIG. 11 illustrates an example of the data content of the database 34 to be used in the recognition and prediction process by the camera according to the first embodiment. FIG. 12 illustrates an example of the data content of the database 34 following FIG. 11.

The database 34 includes a "database for recognizing a movement or the like in a scene", a "database for identifying a scene", and a "database for predicting an optimal exposure timing for the recognized movement".

The "database for recognizing a movement or the like in a scene" includes, for example, items of sports (tennis, baseball, badminton, and golf) for which people use tools.

The "database for identifying a scene" includes, for example, items of movements of a human body, tool 1 (racket), and tool 2 (ball).

The "database for predicting an optimal exposure timing for the recognized movement" includes, for example, items of timings of the impact between the tool 1 (racket) and the tool 2 (ball).

Specific examples of the optimal exposure timing include, for example, a moment when the racket hits the ball, a moment when the bat hits the ball, a moment when the racket hits the shuttlecock, a moment when the ball is determined to enter the goal, and the like.

(Operation in Single Shooting Mode)

The camera according to the first embodiment has a predicted optimal exposure timing priority mode and a shooting trigger priority mode as the single shooting modes. The predicted optimal exposure timing priority mode gives priority to the predicted optimal exposure timing. The shooting trigger priority mode gives priority to the shooting trigger. In the following, descriptions are given in order.

FIGS. 13 and 14 illustrate an example of an operation flow of an imaging process by a camera according to the first embodiment in a case where the single shooting mode, in particular, the predicted optimal exposure timing priority mode is selected.

First, the exposure timing control function is turned on, and the single shooting mode, in particular, the predicted optimal exposure timing priority mode is selected at the trigger IF 41 (step S401). Thereafter, the exposure timing control section 12 determines whether or not it is within the predicted optimal exposure timing allowable time (step S402). It is to be noted that the "predicted optimal exposure timing allowable time" will be described later with reference to FIGS. 20A and 20B.

In a case where it is determined that it is not within the predicted optimal exposure timing allowable time (step S402; N), the exposure timing control section 12 thereafter determines whether or not the predicted optimal exposure timing allowable time is ended (step S414). In a case where it is determined that the predicted optimal exposure timing allowable time is not ended (that it is before entering the predicted optimal exposure timing allowable time) (step S414; N), the exposure timing control section 12 causes the process to return to step S402. In contrast, in a case where it is determined that the predicted optimal exposure timing allowable time is ended by the exposure timing control section 12 (step S414; Y), the image development process section 33 records image data shot on the basis of the predicted exposure timing that is closest in time to the shooting trigger in the internal memory 35 or the recording medium 43 (step S415 of FIG. 17B which will be described later).

Further, in a case where it is determined that it is within the predicted optimal exposure timing allowable time (step S402; Y), the exposure timing control section 12 thereafter determines whether or not a predicted optimal exposure timing signal is present as an interrupt signal from the recognition and prediction process section 31 (step S403). In a case where it is determined that the predicted optimal exposure timing signal is present (step S403; Y), the exposure timing control section 12 causes the exposure section 11 to start the exposure (step S411). When the exposure by the exposure section 11 is ended, the exposure timing control section 12 causes the exposure section 11 to start reading the image data (step S412), and causes the process to return to step S402. Here, when the reading of the image data is ended, the image development process section 33 performs the image development process, and the image data shot on the basis of the predicted optimal exposure timing is recorded (tentatively stored) in the internal memory 35 (step S413 FIGS. 17A, and FIG. 18A which will be described later).

Further, in a case where it is determined that the predicted optimal exposure timing signal is absent (step S403; N), the exposure timing control section 12 thereafter determines whether or not a shooting trigger is present (step S404). In a case where it is determined that the shooting trigger is absent (step S404; N), the exposure timing control section 12 causes the process to return to step S402. In a case where it is determined that the shooting trigger is present (step S404; Y), the exposure timing control section 12 causes the exposure section 11 to start exposure based on the shooting trigger (step S405). Thereafter, the exposure timing control section 12 determines whether or not a predicted optimal exposure timing signal is present as an interrupt signal from the recognition and prediction process section 31 before the end of the exposure based on the shooting trigger (step S406). In a case where it is determined that the predicted optimal exposure timing signal is present before the end of the exposure based on the shooting trigger (step S406; Y), the exposure timing control section 12 resets the exposure based on the shooting trigger (step S410), and causes the process to return to step S411.

In contrast, in a case where it is determined that the predicted optimal exposure timing signal is absent before the end of the exposure based on the shooting trigger (step S406; N), when the exposure by the exposure section 11 is ended, the exposure timing control section 12 causes the exposure section 11 to start reading the image data (step S407). Thereafter, the exposure timing control section 12 determines whether or not a predicted optimal exposure timing signal as an interrupt signal from the recognition and prediction process section 31 is present before the end of the reading of the image data based on the shooting trigger (step S408). In a case where it is determined that the predicted optimal exposure timing signal is present before the end of the reading of the image data based on the shooting trigger (step S408; Y), the exposure timing control section 12 resets the reading of the image data based on the shooting trigger (step S410), and causes the process to proceed to step S411. In a case where it is determined that the predicted optimal exposure timing signal is absent before the end of the reading of the image data based on the shooting trigger (step S408; N), the exposure timing control section 12 may cause the process to return to step S402. Here, when the reading of the image data is ended, the image development process section 33 performs the image development process, and the image development process section 33 records the image data shot on the basis of the shooting trigger in the internal memory 35 or the recording medium 43 (step S409, FIGS. 17A, and 17B which will be described later).

FIGS. 15 and 16 illustrate an example of an operation flow of an imaging process by the camera according to the first embodiment in a case of the single shooting mode, in particular, the shooting trigger priority mode.

First, the exposure timing control function is turned on, and the single shooting mode, in particular, the shooting trigger priority mode is selected at the trigger IF 41 (step S401). Thereafter, the exposure timing control section 12 determines whether or not it is within the predicted optimal exposure timing allowable time (step S402). It is to be noted that the "predicted optimal exposure timing allowable time" will be described later with reference to FIGS. 20A and 20B.

In a case where it is determined that it is not within the predicted optimal exposure timing allowable time (step S402; N), the exposure timing control section 12 thereafter determines whether or not the predicted optimal exposure timing allowable time is ended (step S414). In a case where it is determined that the predicted optimal exposure timing allowable time is not ended (that it is before entering the predicted optimal exposure timing allowable time) (step S414; N), the exposure timing control section 12 causes the process to return to step S402. In contrast, in a case where it is determined by the exposure timing control section 12 that the predicted optimal exposure timing allowable time is ended (step S414; Y), the image development process section 33 records image data shot on the basis of the predicted exposure timing that is closest in time to the shooting trigger in the internal memory 35 or the recording medium 43 (step S415 and FIG. 17B which will be described later).

Further, in a case where it is determined that it is within the predicted optimal exposure timing allowable time (step S402; Y), the exposure timing control section 12 thereafter determines whether or not a predicted optimal exposure timing signal is present as an interrupt signal from the recognition and prediction process section 31 (step S403). In a case where it is determined that the predicted optimal exposure timing signal is present (step S403; Y), the exposure timing control section 12 causes the exposure section 11 to start exposure based on the predicted optimal exposure timing (step S511). Thereafter, the exposure timing control section 12 determines whether or not a shooting trigger is present before the end of the exposure based on the predicted optimal exposure timing (step S512). In a case where it is determined that the shooting trigger is present before the end of the exposure based on the predicted optimal exposure timing (step S512; Y), the exposure timing control section 12 resets the exposure based on the predicted optimal exposure timing (step S410), and causes the process to proceed to step S405.

In contrast, in a case where it is determined that the shooting trigger is absent before the end of the exposure based on the predicted optimal exposure timing (step S512; N), when the exposure by the exposure section 11 is ended, the exposure timing control section 12 causes the exposure section 11 to start reading the image data (step S513). Thereafter, the exposure timing control section 12 determines whether or not the shooting trigger is present before the end of the reading of the image data based on the predicted optimal exposure timing (step S514). In a case where it is determined that the shooting trigger is present before the end of the reading of the image data based on the predicted optimal exposure timing (step S514; Y), the exposure timing control section 12 resets the reading of the image data based on the predicted optimal exposure timing (step S410), and causes the process to proceed to step S405. In a case where it is determined that the shooting trigger is absent before the end of the reading of the image data based on the predicted optimal exposure timing (step S514; N), the exposure timing control section 12 causes the process to return to step S402. Here, when the reading of the image data is ended, the image development process is performed by the image development process section 33, and the image data shot on the basis of the predicted optimal exposure timing is recorded (tentatively stored) in the internal memory 35 (step S515 and FIG. 17A which will be described later).

Further, in a case where it is determined that the predicted optimal exposure timing signal is absent (step S403; N), the exposure timing control section 12 thereafter determines whether or not a shooting trigger is present (step S404). In a case where it is determined that the shooting trigger is absent (step S404; N), the exposure timing control section 12 causes the process to return to step S402. In a case where it is determined that the shooting trigger is present (step S404; Y), the exposure timing control section 12 causes the exposure section 11 to start exposure based on the shooting trigger (step S405). When the exposure by the exposure section 11 is ended, the exposure timing control section 12 causes the exposure section 11 to start reading the image data (step S407), and causes the process to return to step S402. Here, when the reading of the image data is ended, the image development process is performed by the image development process section 33, and the image data shot on the basis of the shooting trigger is recorded in the internal memory 35 or the recording medium 43 by the image development process section 33 (step S409, FIGS. 17A, 17B, 19A, and 19B which will be described later).

(Specific Example of Exposure Timing in Single Shooting Mode)

FIGS. 17A and 17B illustrate an outline of an exposure timing and an image data reading timing in the single shooting mode related to the camera according to the first embodiment. FIGS. 17A and 17B illustrate examples of the exposure timing and the image data reading timing common to the predicted optimal exposure timing priority mode (FIGS. 13 and 14) and the shooting trigger priority mode (FIGS. 15 and 16) in the single shooting mode. In FIGS. 17A and 17B, step numbers corresponding to the operation flows of FIGS. 13 and 14 or FIGS. 15 and 16 are given as appropriate.

As illustrated in FIG. 17A, in the single shooting mode, the camera according to the first embodiment is configured to record, in the internal memory 35 or the recording medium 43, not only the image data shot on the basis of the shooting trigger within a predetermined period (a predicted optimal exposure timing allowable time width) but also the image data shot on the basis of the predicted exposure timing within the predetermined period.

Further, as illustrated in FIG. 17B, in a case where the shooting based on the predicted exposure timing has been performed a plurality of times within the predetermined period (the predicted optimal exposure timing allowable time width) in the single shooting mode, the camera according to the first embodiment is configured to record, in the internal memory 35 or the recording medium 43, the image data shot on the basis of the shooting trigger within the predetermined period and the image data shot on the basis of the predicted exposure timing that is closest in time to the shooting trigger within the predetermined period.

FIGS. 18A and 18B illustrate examples of an exposure timing and an image data reading timing related to the camera according to the first embodiment in a case where the single shooting mode, in particular, the predicted optimal exposure timing priority mode is selected (FIGS. 13 and 14). In FIGS. 18A and 18B, step numbers corresponding to the operation flows in FIGS. 13 and 14 are given as appropriate.

As illustrated in FIG. 18A, in the case where the single shooting mode, in particular, the predicted optimal exposure timing priority mode is selected, the camera according to the first embodiment is configured, in a case where the shooting trigger occurs when the exposure section 11 is performing the exposure based on the predicted exposure timing or the reading of the image data within the predetermined period (the predicted optimal exposure timing allowable time width), to ignore the shooting trigger and control the exposure section 11 to refrain from performing the exposure based on the shooting trigger.

Further, as illustrated in FIG. 18B, in the case where the single shooting mode, in particular, the predicted optimal exposure timing priority mode is selected, the camera according to the first embodiment is configured, in a case where the predicted exposure timing occurs when the exposure section 11 is performing the exposure based on the shooting trigger or the reading of the image data within the predetermined period (the predicted optimal exposure timing allowable time width), to reset the exposure based on the shooting trigger or the reading of the image data and cause the exposure section 11 to start exposure based on the predicted exposure timing.

FIGS. 19A and 19B illustrate examples of an exposure timing and an image data reading timing related to the camera according to the first embodiment in a case where the single shooting mode, in particular, the shooting trigger priority mode is selected (FIGS. 15 and 16). In FIGS. 19A and 19B, step numbers corresponding to the operation flows in FIGS. 15 and 16 are given as appropriate.

As illustrated in FIG. 19A, in the case where the single shooting mode, in particular, the shooting trigger priority mode is selected, the camera according to the first embodiment is configured, in a case where the shooting trigger occurs when the exposure section 11 is performing the exposure based on the predicted exposure timing or the reading of the image data within the predetermined period (the predicted optimal exposure timing allowable time width), to reset the exposure based on the predicted exposure timing or the reading of the image data and cause the exposure section 11 to start exposure based on the shooting trigger.

Further, as illustrated in FIG. 19B, in the case where the single shooting mode, in particular, the shooting trigger priority mode is selected, the camera according to the first embodiment is configured, in a case where the predicted exposure timing occurs when the exposure section 11 is performing the exposure based on the shooting trigger or the reading of the image data within the predetermined period (the predicted optimal exposure timing allowable time width), to ignore the predicted exposure timing and control the exposure section 11 to refrain from performing the exposure based on the predicted exposure timing.

FIGS. 20A and 20B illustrate an example of a control of the predicted optimal exposure timing allowable time by halfway-pressing in the single shooting mode. It is to be noted that, herein, the halfway-pressing may refer to halfway-pressing of the shutter button as the shooting trigger, or may be halfway-pressing of a button other than the shutter button, a button dedicated to the halfway-pressing function, or the like to which the halfway-pressing function of the shutter button is assigned. It is to be noted that FIG. 20A illustrates a halfway-pressing timing and an ON timing of the shooting trigger. FIG. 20B illustrates an exposure timing and an image data reading timing of the exposure section 11.

As illustrated in FIGS. 20A and 20B, the predicted optimal exposure timing allowable time is started, for example, by halfway-pressing of the shooting trigger. Further, an end time of the predicted optimal exposure timing allowable time is set, for example, from the shooting trigger to a time when a shorter or longer one of the times (1) and (2) below elapses.
(1) set time
(2) time equivalent to the time from the halfway-pressing to the shooting trigger (Reduction in Power Consumption by Suppressing Frame Rate of Recognition and Prediction Process)

FIGS. 21A. 21B, 21C, 21D illustrate examples of an ON timing of the exposure timing control function (FIG. 21A), an ON timing of the shooting trigger (FIG. 21B), a timing of the recognition and prediction process (FIG. 21C), and a timing of main image shooting (FIG. 21D), related to the camera according to the first embodiment.

For example, as illustrated in FIGS. 21A and 21C, in a case where the exposure timing control function is turned on, and at the same time, the image data is read at a high frame rate (e.g., 1000 fps) for the recognition and prediction process, and the high-speed recognition and prediction process is executed, there is a concern that the power consumption increases. Therefore, as illustrated in FIGS. 22A, 22B, 22C, 22D or FIGS. 23A, 23B, 23C, 23D below, the power consumption may be reduced by suppressing the frame rate of the recognition and prediction process. It is to be noted that the suppression of the frame rate of the recognition and prediction process may be a process common to the continuous shooting mode, the single shooting mode, and the moving image mode.

FIGS. 22A, 22B, 22C, 22D illustrate first examples of an ON timing of the exposure timing control function (FIG. 22A), a halfway-pressing timing and an ON timing of the shooting trigger (FIG. 22B), a timing of the recognition and prediction process (FIG. 22C), and a timing of the main image shooting (FIG. 22D), of the camera according to the first embodiment in a case of suppressing the frame rate of the recognition and prediction process. It is to be noted that, herein, the halfway-pressing may refer to halfway-pressing of the shutter button as the shooting trigger, or may be halfway-pressing of a button other than the shutter button, a button dedicated to the halfway-pressing function, or the like to which the halfway-pressing function of the shutter button is assigned.

For example, as illustrated in FIGS. 22A and 22C, the exposure timing control function may be turned on, and at the same time, the image data may be read at a relatively low frame rate (e.g., 60 fps) for the recognition and prediction process, to perform a relatively-low-speed recognition and prediction process. Further, in a case where the shooting trigger is pressed halfway, the image data may be read at a high frame rate (e.g., 1000 fps) for the recognition and prediction process, and a high-speed recognition and prediction process may be executed. Thereafter, in a case where the shooting trigger is turned on and the halfway-pressing is released, the reading of the image data may be returned to the relatively low frame rate (e.g., 60 fps) to execute a relatively-low-speed recognition and prediction process.

FIGS. 23A, 23B, 23C, FIG. 23D illustrate second examples of the ON timing of the exposure timing control function (FIG. 23A), the ON timing of the shooting trigger (FIG. 23B), the timing of the recognition and prediction process (FIG. 23C), and the timing of the main image shooting (FIG. 23D), of the camera according to the first embodiment in the case of suppressing the frame rate of the recognition and prediction process.

As illustrated in FIG. 8, the camera according to the first embodiment has an automatic determination mode for automatically determining whether or not the exposure timing control is necessary on the camera side. The automatic determination mode may be used to recognize a main subject, and vary the frame rate in accordance with the scene, the movement, or the like of the subject. For example, as illustrated in FIGS. 23A and 23C, the exposure timing control function may be turned on, and at the same time, the image data may be read at a relatively low frame rate (e.g., 60 fps) for the recognition and prediction process to execute a relatively-low-speed recognition and prediction process. Further, the automatic determination mode may be used to recognize a main subject, and vary the frame rate in accordance with the scene, the movement, or the like of the subject. In the example in FIG. 23C, the image data is read at a high frame rate (e.g., 500 fps) for the recognition and prediction process by performing determination based on the scene, the movement, or the like of the subject, to execute a high-speed recognition and prediction process. Thereafter, the reading of the image data is returned to the relatively low frame rate (e.g., 60 fps) by performing determination based on the scene, the movement, or the like of the subject again, to execute the relatively-low-speed recognition and prediction process.

(Example of Notification to User)

FIG. 24 illustrates an example of notification to the user in a case where it is determined that it is the optimal exposure timing at the time of shooting by the camera according to the first embodiment.

At the time of shooting, the display section 42 may perform live-view display of the subject to be shot by the exposure section 11 and may display a notification indicating that it is the optimal exposure timing in association with the image of the live-view display in a case where it is the optimal exposure timing predicted by the recognition and prediction process section 31. For example, as in Example 1 of FIG. 24, it may superimpose characters (e.g., "Adjust Trigger"), marks, or the like on the live-view image at the moment when it is determined that it is the optimal exposure timing. For visibility, the superimposed portion may be left to be displayed for about 0.5 s. Further, as in Example 2 of FIG. 24, a frame may be superimposed on the live-view image at the moment when it is determined that it is the optimal exposure timing. For visibility, the superimposed portion may be left to be displayed for about 0.5 s.

FIG. 25 illustrates an example of notifying the user that shooting has been performed at the optimal exposure timing upon reproducing the image shot by the camera according to the first embodiment.

The display section 42 may display a notification indicating that it is the image data obtained at the optimal exposure timing upon reproducing the image in association with the image data obtained by performing shooting of the subject at the optimal exposure timing by the exposure timing control. As illustrated in FIG. 25, nothing in particular is displayed for the frame image resulting from normal shooting. For example, as illustrated in Example 1 of FIG. 25, regarding the frame image obtained by performing the exposure timing control, an amount of a difference between the timing of performing continuous shooting when the exposure timing control is in an OFF state and the timing of performing shooting when the exposure timing control is in an ON state may be superimposed on the screen. Further, as illustrated in Example 2 of FIG. 25, a mark may be superimposed on the screen. Further, as illustrated in Example 3 of FIG. 25, a screen frame may be displayed.

(Recording of Metadata)

The notification to the user may be performed, besides the display on the display section 42 described above, by recording it on the image data as metadata upon recording in the internal memory 35 or the recording medium 43. In this case, the image data may be still image data recorded in the continuous shooting mode or the single shooting mode, or may be moving image data recorded in the moving image mode. Information to be recorded as the metadata may be information of ON/OFF of the exposure timing control function, or may be information, of the amount of the difference between the exposure timing of the image data based on the predicted optimal exposure timing and the exposure timing of the image data based on the shooting trigger, which has been recorded when the exposure timing control function is in an ON state.

Recording it as metadata on the image data makes it possible, for example, to know that the exposure timing has been adjusted to be the optimal exposure timing in a case where the image data is reproduced by, not only the camera body, but also a PC (personal computer) or any other reproducing apparatus.

[1.3 Effects and Modifications]

As described above, according to the camera of the first embodiment, the exposure timing of the exposure section 11 is controlled to cause the shooting of the subject to be performed at the optimal exposure timing predicted by the recognition and prediction process section 31. Therefore, it is possible to perform shooting of a subject moving at a high speed with high image quality at a desired timing.

According to the camera of the first embodiment, it is possible to obtain an image with much higher quality, for example, as compared with a method in which a still image is shot behind moving-image shooting and an image at the optimal exposure timing is cut out from the moving image.

Usually, a general camera causes a delay between a time at which the photographer has responded or a time at which the shutter button is pressed and a time at which shooting is actually performed. In addition, a mirrorless camera causes a delay in a display section. Therefore, shooting cannot be performed in accordance with the intention of the photographer, and the shutter timing does not match that based on the intention of the photographer. According to the camera of the first embodiment, it is possible to perform shooting of a subject moving at a high speed with high image quality at a desired timing, regardless of such delays. According to the camera of the first embodiment, it is not necessary to be aware of a shutter lag. According to the camera of the first embodiment, it is possible to perform shooting of an optimal moment with smaller number of times of shooting in the single shooting mode. Further, according to the camera of the first embodiment, it is possible to perform shooting of a subject moving at a high speed at a desired timing with less previous knowledge of how the subject moves.

It is to be noted that the effects described herein are merely illustrative and non-limiting. Further, any other effect may be provided. This is similarly applicable to effects of other embodiments below.

2. Second Embodiment

Next, a camera and an imaging device according to a second embodiment of the present disclosure are described. It is to be noted that, in the following, the same reference numerals are given to substantially the same parts as the components of the camera and the imaging device according to the first embodiment described above, and descriptions thereof will be omitted as appropriate.

FIG. 26 illustrates an outline of a configuration of a camera to which the imaging device according to the second embodiment is applied.

The camera according to the second embodiment includes an imaging device 10A instead of the imaging device 10 in the camera according to the first embodiment. Further, the camera according to the second embodiment includes a processor 30A instead of the processor 30 in the camera according to the first embodiment.

The camera according to the second embodiment includes the recognition and prediction process section 31 not in the processor 30A but in the imaging device 10A.

In the camera according to the second embodiment, the recognition and prediction process section 31 is provided in the imaging device 10A. This makes it possible to transfer the image data for the recognition and prediction process from the exposure section 11 to the recognition and prediction process section 31 at a higher speed. Accordingly, it is possible to perform the recognition and prediction process with higher accuracy.

Other configurations, operation, and effects may be substantially similar to those of the camera and the imaging device according to the first embodiment described above.

3. Third Embodiment

Next, a camera and an imaging device according to a third embodiment of the present disclosure are described. It is to be noted that, in the following, the same reference numerals are given to substantially the same parts as the components of the camera and the imaging device according to the first or the second embodiment described above, and descriptions thereof will be omitted as appropriate.

FIG. 27 illustrates an outline of a configuration of a camera to which the imaging device according to the third embodiment is applied.

The camera according to the second embodiment includes an imaging device 60 separately from the imaging device 10 as compared with the configuration of the camera according to the first embodiment. It is to be noted that the imaging device 60 may be provided separately from the camera body 100, or may be provided separately from the imaging device 10 but still inside the camera body 100.

The separately provided imaging device 60 includes an exposure section 61 and an exposure start control section 62.

The exposure section 61 includes an imaging element such as a CCD or a CMOS. The exposure section 61 shoots a subject, and outputs image data read at a high speed by pixel thinning or the like as an imaging signal for the recognition and prediction process.

The exposure start control section 62 receives, from the recognition and prediction process section 31, for example, a process start signal at a timing based on the shooting trigger by the trigger IF 41. The exposure start control section 62 causes the exposure section 61 to start exposure on the basis of the process start signal from the recognition and prediction process section 31.

In the camera according to the second embodiment, the recognition and prediction process section 31 performs the recognition and prediction process on the basis of the imaging signal from the separately provided imaging device 60. It is desirable that the shooting angle-of-view range of the imaging device 60 be wider than the shooting angle-of-view range of the imaging device 10 that performs imaging at a normal frame rate. This makes it possible to perform the recognition and prediction process for a wider shooting angle-of-view range.

It is to be noted that, in the configuration example illustrated in FIG. 27, the imaging device 10 outputs only the normal image data with all the pixels being read. However, as with the camera according to the first embodiment, it may output image data read at a high speed for the recognition and prediction process. The recognition and prediction process section 31 may perform the recognition and prediction process on the basis of both the image data read at a high speed from the separately provided imaging device 60 and the image data read at a high speed from the imaging device 10. This makes it possible to perform the recognition and prediction process with higher accuracy.

Other configurations, operation, and effects may be substantially similar to those of the camera and the imaging device according to the first embodiment described above.

4. Other Embodiments

The technology of the present disclosure is not limited to the description above of each of the embodiments, and is modifiable in a variety of ways.

For example, the present technology may have the following configurations.

According to the present technology having the following configurations, an exposure timing of an exposure section is controlled to cause shooting of a subject to be performed at a predicted optimal exposure timing. It is therefore possible to perform shooting of a subject moving at a high speed with high image quality at a desired timing.

(1)

An imaging device including:

an exposure section; and a controller that controls, at an exposure timing based on a predicted exposure timing at which a state of a subject shot at a first frame rate is predicted to satisfy a predetermined condition, the exposure section at a second frame rate, the second frame rate being different from the first frame rate.

(2)

The imaging device according to (1) described above, in which the controller controls the exposure section to allow the exposure timing to match the predicted exposure timing.

(3)

The imaging device according to (1) described above, in which the controller controls the exposure timing of the exposure section on the basis of the predicted exposure timing and a shooting trigger.

(4)

The imaging device according to (3) described above, in which the controller controls the exposure timing of the exposure section in accordance with a time difference between the predicted exposure timing and the shooting trigger, in a case where the predicted exposure timing is within a predetermined period based on the shooting trigger.

(5)

The imaging device according to (4) described above, in which the predetermined period is set in accordance with a user operation.

(6)

The imaging device according to (4) or (5) described above, further including a storage section in which image data is to be recorded, in which the controller records, in the storage section, image data shot on the basis of the predicted exposure timing within the predetermined period and image data shot on the basis of the shooting trigger within the predetermined period.

(7)

The imaging device according to (6) described above, in which the controller records, in the storage section, the image data shot on the basis of the shooting trigger within the predetermined period and image data shot on the basis of the predicted exposure timing closest in time to the shooting trigger within the predetermined period, in a case where a plurality of times of shooting based on the predicted exposure timing has been performed within the predetermined period.

(8)

The imaging device according to (4) or (5) described above, in which the controller controls the exposure section to prevent exposure based on the shooting trigger, in a case where the shooting trigger occurs when the exposure section is performing exposure based on the predicted exposure timing or image data reading within the predetermined period.

(9)

The imaging device according to (4) or (5) described above, in which the controller resets exposure based on the shooting trigger or image data reading, and causes the exposure section to start exposure based on the predicted exposure timing, in a case where the predicted exposure timing occurs when the exposure section is performing the exposure based on the shooting trigger or the image data reading within the predetermined period.

(10)

The imaging device according to (4) or (5) described above, in which the controller resets exposure based on the predicted exposure timing or image data reading, and causes the exposure section to start exposure based on the shooting trigger, in a case where the shooting trigger occurs when the exposure section is performing the exposure based on the predicted exposure timing or the image data reading within the predetermined period.

(11)

The imaging device according to (4) or (5) described above, in which the controller controls the exposure section to prevent exposure based on the predicted exposure timing, in a case where the predicted exposure timing occurs when the exposure section is performing exposure based on the shooting trigger or image data reading within the predetermined period.

(12)

The imaging device according to any one of (1) to (11) described above, in which the predicted exposure timing includes a timing at which, in a case where a movement of the subject is predicted in accordance with the movement of the subject shot at the first frame rate, the movement of the subject that has been predicted satisfies a predetermined state.

(13)

The imaging device according to any one of (1) to (12) described above, in which the controller causes the exposure section to start shooting at the first frame rate in accordance with an instruction from a user.

(14)

The imaging device according to (13) described above, in which the controller causes the exposure section to perform shooting for predicting the state of the subject at a frame rate different from the first frame rate in accordance with a predetermined determination condition.

(15)

The imaging device according to (14) described above, in which the predetermined determination condition includes a condition based on a user operation.

(16)

The imaging device according to (15) described above, in which prediction of the state of the subject is started on the basis of a user operation on a first operation member, and the predetermined determination condition includes a condition based on a user operation on a second operation member.

(17)

The imaging device according to (14) described above, in which the predetermined determination condition includes a condition based on the state of the subject.

(18)

The imaging device according to any one of (1) to (17) described above, further including a notification section that makes notification that shooting of the subject has been performed at the exposure timing based on the predicted exposure timing.

(19)

An imaging control method including:

shooting a subject at a first frame rate with an imaging device including an exposure section; and controlling, at an exposure timing based on a predicted exposure timing at which a state of the subject shot at the first frame rate is predicted to satisfy a predetermined condition, the exposure section at a second frame rate, the second frame rate being different from the first frame rate.

(20)

A program causing a computer to execute processes including:

shooting a subject at a first frame rate with an imaging device including an exposure section; and controlling, at an exposure timing based on a predicted exposure timing at which a state of the subject shot at the first frame rate is predicted to satisfy a predetermined condition, the exposure section at a second frame rate, the second frame rate being different from the first frame rate.

This application claims the priority on the basis of Japanese Patent Application No. 2019-110548 filed on Jun. 13, 2019 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device, comprising:
an exposure section; and
a controller configured to control, at an exposure timing based on a predicted exposure timing at which a state of a subject shot at a first frame rate is predicted to satisfy a specific condition, the exposure section at a second frame rate, the second frame rate being different from the first frame rate, wherein
the exposure timing of the exposure section is controlled based on a time difference between the predicted exposure timing and a shooting trigger, in a case where the predicted exposure timing is within a specific period based on the shooting trigger.

2. The imaging device according to claim 1, wherein the controller is further configured to control the exposure section to allow the exposure timing to match the predicted exposure timing.

3. The imaging device according to claim 1, wherein the specific period is set based on a user operation.

4. The imaging device according to claim 1, further comprising
a storage section configured to record image data, wherein the controller is further configured to record, in the storage section, image data shot based on the predicted exposure timing within the specific period and image data shot based on the shooting trigger within the specific period.

5. The imaging device according to claim 4, wherein the controller is further configured to record, in the storage section, the image data shot based on the shooting trigger within the specific period and image data shot based on the predicted exposure timing closest in time to the shooting trigger within the specific period, in a case where a plurality of times of shooting based on the predicted exposure timing has been performed within the specific period.

6. The imaging device according to claim 1, wherein the controller is further configured to control the exposure section to prevent exposure based on the shooting trigger, in a case where the shooting trigger occurs when the exposure section is performing exposure based on the predicted exposure timing or image data reading within the specific period.

7. The imaging device according to claim 1, wherein the controller is further configured to reset exposure based on the shooting trigger or image data reading, and causes the exposure section to start exposure based on the predicted exposure timing, in a case where the predicted exposure timing occurs when the exposure section is performing the exposure based on the shooting trigger or the image data reading within the specific period.

8. The imaging device according to claim 1, wherein the controller is further configured to reset exposure based on the predicted exposure timing or image data reading, and causes the exposure section to start exposure based on the shooting trigger, in a case where the shooting trigger occurs when the exposure section is performing the exposure based on the predicted exposure timing or the image data reading within the specific period.

9. The imaging device according to claim 1, wherein the controller is further configured to control the exposure section to prevent exposure based on the predicted exposure timing, in a case where the predicted exposure timing occurs when the exposure section is performing exposure based on the shooting trigger or image data reading within the specific period.

10. The imaging device according to claim 1, wherein the predicted exposure timing comprises a timing at which, in a case where a movement of the subject is predicted based on the movement of the subject shot at the first frame rate, the movement of the subject that has been predicted satisfies a specific state.

11. The imaging device according to claim 1, wherein the controller causes the exposure section to start shooting at the first frame rate based on an instruction from a user.

12. The imaging device according to claim 11, wherein the controller causes the exposure section to perform shooting for predicting the state of the subject at a frame rate different from the first frame rate based on a specific determination condition.

13. The imaging device according to claim 12, wherein the specific determination condition comprises a condition based on a user operation.

14. The imaging device according to claim 12, wherein the specific determination condition comprises a condition based on the state of the subject.

15. The imaging device according to claim 13, wherein
the prediction of the state of the subject is started based on a user operation on a first operation member, and
the specific determination condition comprises a condition based on a user operation on a second operation member.

16. The imaging device according to claim 1, further comprising a notification section configured to make notification that shooting of the subject has been performed at the exposure timing based on the predicted exposure timing.

17. An imaging control method, comprising:
shooting a subject at a first frame rate with an imaging device including an exposure section; and
controlling, at an exposure timing based on a predicted exposure timing at which a state of the subject shot at the first frame rate is predicted to satisfy a specific condition, the exposure section at a second frame rate, the second frame rate being different from the first frame rate, wherein
the exposure timing of the exposure section is controlled based on a time difference between the predicted exposure timing and a shooting trigger, in a case where the predicted exposure timing is within a specific period based on the shooting trigger.

18. A non-transitory computer-readable medium having stored thereon, computer-executable instructions that when executed by a computer, causes the computer to execute operations, the operations comprising:
shooting a subject at a first frame rate with an imaging device including an exposure section; and
controlling, at an exposure timing based on a predicted exposure timing at which a state of the subject shot at the first frame rate is predicted to satisfy a specific condition, the exposure section at a second frame rate, the second frame rate being different from the first frame rate, wherein
the exposure timing of the exposure section is controlled based on a time difference between the predicted exposure timing and a shooting trigger, in a case where the predicted exposure timing is within a specific period based on the shooting trigger.

* * * * *